United States Patent
Sibtain et al.

(10) Patent No.: US 10,987,647 B2
(45) Date of Patent: Apr. 27, 2021

(54) MULTISTAGE CATALYST INJECTION SYSTEM FOR AN OLEFIN POLYMERIZATION REACTOR

(71) Applicant: NOVA Chemicals (International) S.A., Fribourg (CH)

(72) Inventors: Fazle Sibtain, Calgary (CA); Eric Clavelle, Calgary (CA); Robert Van Asseldonk, Airdrie (CA); Lawrence Van Asseldonk, Sarnia (CA); Geoffrey Harding, Calgary (CA)

(73) Assignee: NOVA Chemicals (International) S.A., Fribourg (CH)

( * ) Notice: Subject to any disclaimer, the term of this patent is extended or adjusted under 35 U.S.C. 154(b) by 90 days.

(21) Appl. No.: 16/451,667

(22) Filed: Jun. 25, 2019

(65) Prior Publication Data

US 2019/0388863 A1  Dec. 26, 2019

(30) Foreign Application Priority Data

Jun. 26, 2018  (CA) .................................. CA 3009291

(51) Int. Cl.
  *B01J 14/00* (2006.01)
  *B01J 4/00* (2006.01)
  (Continued)

(52) U.S. Cl.
  CPC ........... *B01J 14/00* (2013.01); *B01J 19/0066* (2013.01); *B01J 19/06* (2013.01); *B01J 19/1818* (2013.01);
  (Continued)

(58) Field of Classification Search
  USPC .................................. 526/88, 919; 422/131
  See application file for complete search history.

(56) References Cited

U.S. PATENT DOCUMENTS

| | | | |
|---|---|---|---|
| 4,127,507 | A | 11/1978 | Fannin et al. |
| 4,250,288 | A | 2/1981 | Lowery, Jr. et al. |

(Continued)

OTHER PUBLICATIONS

ASTM D 1238-04; Standard Test Method for Melt Flow Rates of Thermoplastics by Extrusion Plastometer; Copyright ASTM International; Current edition approved Mar. 1, 2004. Published Apr. 2004. Originally approved in 1965. Last previous edition approved in 2001 as D 1238-01. pp. 1-13.

*Primary Examiner* — Fred M Teskin
(74) *Attorney, Agent, or Firm* — Thomas J. Styslinger

(57) ABSTRACT

This disclosure relates to a method and an apparatus for the delivery of a multi-component olefin polymerization catalyst to a polymerization reactor. The apparatus includes: a first catalyst component delivery conduit; a second catalyst component delivery conduit which is disposed within the first catalyst component delivery conduit; a first catalyst component mixing conduit; a third catalyst component delivery conduit which is disposed within the first catalyst component mixing conduit; a second catalyst component mixing conduit comprising an upstream section and a downstream section, the downstream section terminating within the polymerization reactor; and a diluent delivery conduit; the first and second catalyst component delivery conduits each being open-ended and co-terminating at the first catalyst component mixing conduit; the first catalyst component mixing conduit and the third catalyst component delivery conduit each being open-ended and co-terminating at the upstream section of the second catalyst component mixing conduit; and the diluent delivery conduit terminating at the downstream section of the second catalyst component mixing conduit.

43 Claims, 4 Drawing Sheets

(51) Int. Cl.
*B01J 19/00* (2006.01)
*B01J 19/06* (2006.01)
*B01J 19/18* (2006.01)
*C08F 2/01* (2006.01)
*C08F 2/06* (2006.01)
*C08F 4/50* (2006.01)
*C08F 4/76* (2006.01)

(52) U.S. Cl.
CPC ............. *C08F 2/01* (2013.01); *C08F 2/06* (2013.01); *C08F 4/50* (2013.01); *C08F 4/76* (2013.01)

(56) References Cited

U.S. PATENT DOCUMENTS

| | | | |
|---|---|---|---|
| 4,543,399 | A | 9/1985 | Jenkins, III et al. |
| 4,588,790 | A | 5/1986 | Jenkins, III et al. |
| 5,028,670 | A | 7/1991 | Chinh et al. |
| 5,352,749 | A | 10/1994 | DeChellis et al. |
| 5,405,922 | A | 4/1995 | DeChellis et al. |
| 6,130,300 | A | 10/2000 | Jaber |
| 6,372,864 | B1 | 4/2002 | Brown |
| 6,723,677 | B1 | 4/2004 | Estrada et al. |
| 6,777,508 | B1 | 8/2004 | Parodi et al. |
| 6,878,658 | B2 | 4/2005 | Jaber |
| 6,956,094 | B2 | 10/2005 | Mawson et al. |
| 7,666,810 | B2 | 2/2010 | Wang |
| 2004/0052690 | A1* | 3/2004 | Eaton ............... C08F 10/00 422/131 |
| 2010/0041841 | A1 | 2/2010 | Terry et al. |
| 2016/0229964 | A1 | 8/2016 | Bellehumeur et al. |
| 2017/0044357 | A1 | 2/2017 | Wang et al. |

* cited by examiner

MULTISTAGE CATALYST INJECTION SYSTEM FOR AN OLEFIN POLYMERIZATION REACTOR

CROSS REFERENCE TO RELATED APPLICATIONS

This application claims the benefit of the earlier filing date of Canadian application serial number 3009291 filed on Jun. 26, 2018. The contents of Canadian application serial number 3009291 are incorporated herein by reference in their entirety.

TECHNICAL FIELD

This disclosure relates to a method and an apparatus for the delivery of a multi-component olefin polymerization catalyst to a polymerization reactor.

BACKGROUND

Solution polymerization processes are generally carried out at temperatures above the melting point of the ethylene homopolymer or copolymer product being made. In a typical solution polymerization process, catalyst components, solvent, monomers and hydrogen are fed under pressure to one or more reactors. For ethylene polymerization, or ethylene copolymerization, reactor temperatures can range from about 80° C. to about 300° C. while pressures generally range from about 3 MPag to about 45 MPag. In solution polymerization, the ethylene homopolymer or copolymer produced remains dissolved in the solvent under reactor conditions. The residence time of the solvent in the reactor is relatively short, for example, from about 1 second to about 20 minutes. The solution process can be operated under a wide range of process conditions that allow the production of a wide variety of ethylene polymers.

SUMMARY

Embodiments of this disclosure include a method and apparatus for the delivery of a multi-component olefin polymerization catalyst to a polymerization reactor.

An embodiment of the disclosure is an apparatus for the delivery of a multi-component olefin polymerization catalyst to a polymerization reactor, the apparatus including: a first catalyst component delivery conduit; a second catalyst component delivery conduit which is disposed within the first catalyst component delivery conduit; a first catalyst component mixing conduit; a third catalyst component delivery conduit which is disposed within the first catalyst component mixing conduit; a second catalyst component mixing conduit including an upstream section and a downstream section; and a diluent delivery conduit; the first and second catalyst component delivery conduits each being open-ended and co-terminating at the first catalyst component mixing conduit, the first catalyst component mixing conduit and the third catalyst component delivery conduit each being open-ended and co-terminating at the upstream section of the second catalyst component mixing conduit, the diluent delivery conduit being open-ended and terminating at the downstream section of the second catalyst component mixing conduit, the downstream section of the second catalyst component mixing conduit being open-ended and terminating within the polymerization reactor; wherein, at least one first catalyst component soluble in a first solvent is delivered under pressure along with the first solvent to the first catalyst component mixing conduit via the first catalyst component delivery conduit, at least one second catalyst component soluble in a second solvent is delivered under pressure along with the second solvent to the first catalyst component mixing conduit via the second catalyst component delivery conduit, at least one third catalyst component soluble in a third solvent is delivered under pressure along with the third solvent to the upstream section of the second catalyst component mixing conduit via the third catalyst component delivery conduit, and at least one diluent is delivered under pressure to the downstream section of the second catalyst component mixing conduit via the diluent delivery conduit; whereby, the at least one first catalyst component soluble in the first solvent comes into contact with the at least one second catalyst component soluble in the second solvent within the first catalyst component mixing conduit to form a catalyst support, the at least one third catalyst component soluble in the third solvent comes into contact with the catalyst support within the upstream section of the second catalyst component mixing conduit to form a pre-polymerization catalyst, and the at least one diluent comes into contact with the pre-polymerization catalyst within the downstream section of the second catalyst component mixing conduit before being expelled into the polymerization reactor.

In an embodiment, a second catalyst component delivery conduit is arranged substantially coaxially within a first catalyst component delivery conduit so that the open ends of the first and second catalyst component delivery conduits co-terminate in a substantially concentric arrangement at a first catalyst component mixing conduit.

In an embodiment, a third catalyst component delivery conduit is arranged substantially coaxially within a first catalyst component mixing conduit so that the open ends of the first catalyst component mixing conduit and the third catalyst component delivery conduit co-terminate in a substantially concentric arrangement at an upstream section of a second catalyst component mixing conduit.

In an embodiment, a downstream section of second catalyst component mixing conduit includes a conical section in fluid communication with an open-ended tubular section which terminates within a polymerization reactor, the conical section tapering inwardly to meet the open-ended tubular section.

In an embodiment, an upstream section and a downstream section of the second catalyst component mixing conduit are disposed substantially perpendicular to one another.

In an embodiment, a first catalyst component delivery conduit, a second catalyst component delivery conduit, a first catalyst component mixing conduit, a third catalyst component delivery conduit and an upstream section of a second catalyst component mixing conduit are coaxially arranged.

In an embodiment, a first catalyst component delivery conduit, a second catalyst component delivery conduit, a first catalyst component mixing conduit, a third catalyst component delivery conduit, and an upstream section of a second catalyst component mixing conduit are disposed substantially vertically.

In an embodiment, a first catalyst component delivery conduit, a second catalyst component delivery conduit, and a third catalyst component delivery conduit are in fluid communication with at least one first catalyst component holding tank, at least one second catalyst component holding tank, and at least one third catalyst component holding tank, respectively.

In an embodiment, a diluent delivery conduit is in fluid communication with at least one diluent holding tank.

In an embodiment, a polymerization reactor is a solution phase polymerization reactor.

In an embodiment, a polymerization reactor is a stirred tank reactor.

In an embodiment, a stirred tank reactor includes a bottom wall, a top wall, and a continuous side wall extending upwardly from the bottom wall to the top wall.

In an embodiment, a downstream section of a second catalyst component mixing conduit extends through a continuous side wall of a stirred tank reactor.

In an embodiment, a downstream section of a second catalyst component mixing conduit extends through a bottom wall of a stirred tank reactor.

In an embodiment, a downstream section of a second catalyst component mixing conduit extends through a top wall of a stirred tank reactor.

An embodiment of the disclosure is an apparatus for the delivery of a multi-component olefin polymerization catalyst to a polymerization reactor, the apparatus including: a first catalyst component delivery conduit; a second catalyst component delivery conduit which is disposed within the first catalyst component delivery conduit; a first catalyst component mixing conduit; a third catalyst component delivery conduit which is annularly disposed around the first catalyst component mixing conduit; a second catalyst component mixing conduit including an upstream section and a downstream section; and a diluent delivery conduit; the first and second catalyst component delivery conduits each being open-ended and co-terminating at the first catalyst component mixing conduit, the first catalyst component mixing conduit and the third catalyst component delivery conduit each being open-ended and co-terminating at the upstream section of the second catalyst component mixing conduit, the diluent delivery conduit being open-ended and terminating at the downstream section of the second catalyst component mixing conduit, the downstream section of the second catalyst component mixing conduit being open-ended and terminating within the polymerization reactor; wherein, at least one first catalyst component soluble in a first solvent is delivered under pressure along with the first solvent to the first catalyst component mixing conduit via the first catalyst component delivery conduit, at least one second catalyst component soluble in a second solvent is delivered under pressure along with the second solvent to the first catalyst component mixing conduit via the second catalyst component delivery conduit, at least one third catalyst component soluble in a third solvent is delivered under pressure along with the third solvent to the upstream section of the second catalyst component mixing conduit via the third catalyst component delivery conduit, and at least one diluent is delivered under pressure to the downstream section of the second catalyst component mixing conduit via the diluent delivery conduit; whereby, the at least one first catalyst component soluble in the first solvent comes into contact with the at least one second catalyst component soluble in the second solvent within the first catalyst component mixing conduit to form a catalyst support, the at least one third catalyst component soluble in the third solvent comes into contact with the catalyst support within the upstream section of the second catalyst component mixing conduit to form a pre-polymerization catalyst, and the at least one diluent comes into contact with the pre-polymerization catalyst within the downstream section of the second catalyst component mixing conduit before being expelled into the polymerization reactor.

An embodiment of the disclosure is a method for the delivery of a multi-component olefin polymerization catalyst to a polymerization reactor, the method including: feeding at least one first catalyst component soluble in a first solvent to a first catalyst component mixing conduit via a first catalyst component delivery conduit, feeding at least one second catalyst component soluble in a second solvent to the first catalyst component mixing conduit via a second catalyst component delivery conduit which is disposed within the first catalyst component delivery conduit, feeding at least one third catalyst component soluble in a third solvent to an upstream section of a second catalyst component mixing conduit including an upstream section and a downstream section via a third catalyst component delivery conduit which is disposed within the first catalyst component mixing conduit, and feeding at least one diluent to the downstream section of the second catalyst mixing conduit via a diluent delivery conduit; wherein, the at least one first catalyst component soluble in the first solvent and the at least one second catalyst component soluble in the second solvent come into contact with one another within the first catalyst component mixing conduit to form a catalyst support, the at least one third catalyst component soluble in the third solvent and the catalyst support come into contact with one another within the upstream section of the second catalyst component mixing conduit to form a pre-polymerization catalyst, and the at least one diluent comes in contact with the pre-polymerization catalyst within the downstream section of the second catalyst component mixing conduit before being expelled into the polymerization reactor.

In an embodiment, a hold-up time in the first catalyst component mixing conduit is from 10 to 90 seconds.

In an embodiment, a hold-up time in a first catalyst component mixing conduit is from 20 to 50 seconds.

In an embodiment, a hold-up time in an upstream section of a second catalyst component mixing conduit is from 1 to 50 seconds.

In an embodiment, a hold-up time in a downstream section of a second catalyst component mixing conduit is from 1 to 10 seconds.

In an embodiment, at least one first catalyst component soluble in a first solvent includes a halide compound.

In an embodiment, a halide compound is a chloride compound.

In an embodiment, a chloride compound is tert-butyl chloride.

In an embodiment, at least one second catalyst component soluble in a second solvent includes an organomagnesium compound.

In an embodiment, an organomagnesium compound is butyl(ethyl)magnesium.

In an embodiment, at least one third catalyst component soluble in a third solvent includes a transition metal compound.

In an embodiment, a transition metal compound is titanium tetrachloride.

In an embodiment, at least one diluent includes a hydrocarbon diluent.

In an embodiment, a hydrocarbon diluent is 2-methylpentane.

In an embodiment, a method for the delivery of a multi-component olefin polymerization catalyst to a polymerization reactor further includes feeding at least one fourth catalyst component soluble in a fourth solvent to a downstream section of a second catalyst mixing conduit via a diluent delivery conduit.

In an embodiment, a method for the delivery of a multi-component olefin polymerization catalyst to a polymerization reactor further includes feeding at least one fourth catalyst component soluble in a fourth solvent to either an upstream section or a downstream section of a second catalyst mixing conduit via a fourth catalyst component delivery conduit.

In an embodiment, at least one fourth catalyst component includes an organoaluminum co-catalyst.

In an embodiment, an organoaluminum co-catalyst is diethyl aluminum ethoxide.

In an embodiment, a fourth solvent is a hydrocarbon.

In an embodiment, a fourth solvent is 2-methylpentane.

An embodiment of the disclosure is a method for the delivery of a multi-component olefin polymerization catalyst to a polymerization reactor, the method including: feeding at least one first catalyst component soluble in a first solvent to a first catalyst component mixing conduit via a first catalyst component delivery conduit, feeding at least one second catalyst component soluble in a second solvent to the first catalyst component mixing conduit via a second catalyst component delivery conduit which is disposed within the first catalyst component delivery conduit, feeding at least one third catalyst component soluble in a third solvent to an upstream section of a second catalyst component mixing conduit including an upstream section and a downstream section via a third catalyst component delivery conduit which is annularly disposed around the first catalyst component mixing conduit, and feeding at least one diluent to the downstream section of the second catalyst mixing conduit via a diluent delivery conduit; wherein, the at least one first catalyst component soluble in the first solvent and the at least one second catalyst component soluble in the second solvent come into contact with one another within the first catalyst component mixing conduit to form a catalyst support, the at least one third catalyst component soluble in the third solvent and the catalyst support come into contact with one another within the upstream section of the second catalyst component mixing conduit to form a pre-polymerization catalyst, and the at least one diluent comes in contact with the pre-polymerization catalyst within the downstream section of the second catalyst component mixing conduit before being expelled into the polymerization reactor.

BRIEF DESCRIPTION OF THE DRAWINGS

FIG. 1 shows an apparatus, 100, which can be used for the delivery of a multi-component olefin polymerization catalyst to a polymerization reactor. The Figure shows the presence of four entering streams: S1, S2, S3, and S4. FIG. 1 is not drawn to scale.

FIG. 2 shows an apparatus, 101, which can be used for the delivery of a multi-component olefin polymerization catalyst to a polymerization reactor. The Figure shows the presence of four entering streams: S1, S2, S3, and S4. FIG. 2 is not drawn to scale.

FIG. 3 is not drawn to scale.

FIG. 4 is not drawn to scale.

DETAILED DESCRIPTION

Definition of Terms

Figure 1:
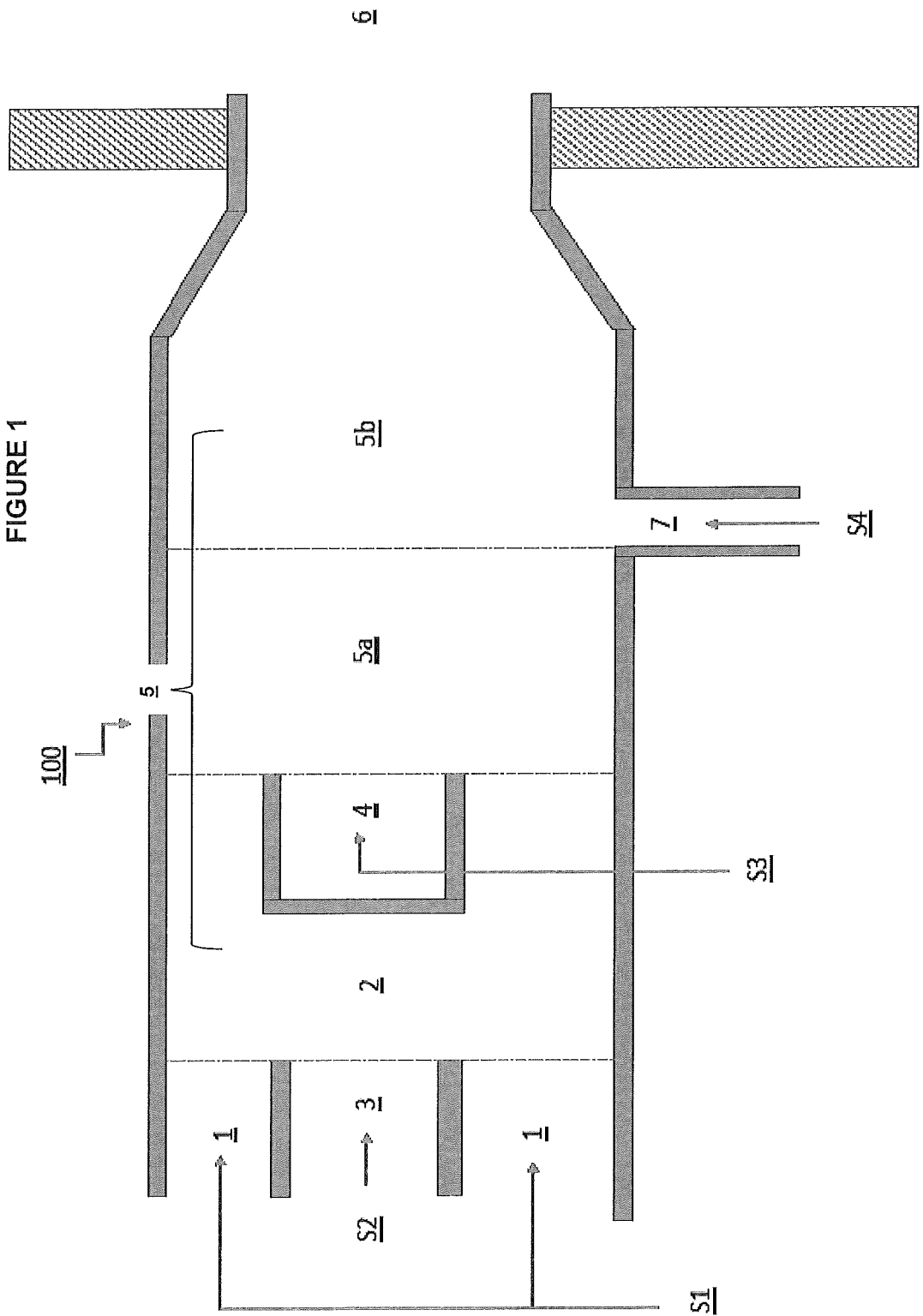
FIG. 1 shows a partial cross section illustration view of an embodiment of the present invention.

Other than in the examples or where otherwise indicated, all numbers or expressions referring to quantities of ingredients, extrusion conditions, etc., used in the specification and claims are to be understood as modified in all instances by the term "about." Accordingly, unless indicated to the contrary, the numerical parameters set forth in the following specification and attached claims are approximations that can vary depending upon the desired properties that the various embodiments desire to obtain. At the very least, and not as an attempt to limit the application of the doctrine of equivalents to the scope of the claims, each numerical parameter should at least be construed in light of the number of reported significant digits and by applying ordinary rounding techniques. The numerical values set forth in the specific examples are reported as precisely as possible. Any numerical values, however, inherently contain certain errors necessarily resulting from the standard deviation found in their respective testing measurements.

It should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

As used herein, the term "soluble" is defined as, susceptible of being dissolved in or as if in a liquid. Further, the term "soluble" with regard to a catalyst component should be taken to mean that the catalyst component can be made to dissolve completely in a solvent to which it is added given sufficient time under standard conditions of pressure and temperature. The term "insoluble" is herein defined as, incapable of being dissolved in a liquid, or soluble only with difficulty or to a slight degree.

As used herein, the term "solvent" is defined as, a substance that dissolves another to form a solution. In contrast, the term "diluent" is given a wider construction to mean a substance that dissolves another substance, or a substance that merely dilutes the concentration of a substance either in solution or in suspension with little or no appreciable solvation of the substance.

As used herein, the term "conduit" is defined as, a pipe, tube, or the like, for conveying fluid.

As used herein, the term "tube" is defined as, a hollow, usually cylindrical body of metal, glass, rubber or other material, used especially for conveying or containing liquids or gases.

As used herein, the term "hold-up time", or residence time of a reactor or flow containing device, is defined as the volume of the device divided by the volumetric flow rate through the device. The total volumetric flow rate can be included of multiple streams entering the device. Alternatively, the hold-up time can be calculated using the volume of the device divided by the exit volumetric flow rate. Alternatively, hold-up time can be defined as the mass of fluid within the device divided by the total mass flow rate through the device.

As used herein, the term "co-terminating" is defined as, having a common boundary; contiguous, bordering. In particular, two conduits or tubes that are arranged one inside the other that both terminate at approximately the same planar location are said to co-terminate.

As used herein, the terms "olefin" and "monomer" refer to a small molecule including a double bond that may chemically react and become chemically bonded with itself or other olefins or monomers to form a polymer.

As used herein, the term "α-olefin" is used to describe a monomer having a linear hydrocarbon chain containing from 3 to 20 carbon atoms having a double bond at one end of the chain.

As used herein, the term "ethylene polymer", refers to macromolecules produced from ethylene monomers and optionally one or more additional monomers (e.g., α-olefins); regardless of the specific catalyst or specific process used to make the ethylene polymer. In the polyethylene art, the one or more additional monomers are called "comonomer(s)" and often include α-olefins. The term "homopolymer" refers to a polymer that contains only one type of monomer. The term "copolymer" refers to a polymer that contains two or more types of monomer. Common ethylene polymers include high density polyethylene (HDPE), medium density polyethylene (MDPE), linear low density polyethylene (LLDPE), very low density polyethylene (VLDPE), ultralow density polyethylene (ULDPE), plastomer and elastomers. The term ethylene polymer also includes polymers produced in a high-pressure polymerization processes; non-limiting examples include low density polyethylene (LDPE), ethylene vinyl acetate copolymers (EVA), ethylene alkyl acrylate copolymers, ethylene acrylic acid copolymers and metal salts of ethylene acrylic acid (commonly referred to as ionomers). The term ethylene polymer also includes block copolymers which may include 2 to 4 comonomers. The term ethylene polymer also includes combinations of, or blends of, the ethylene polymers described above.

Herein, the term "polyolefin" includes ethylene polymers and propylene polymers; non-limiting examples of propylene polymers include isotactic, syndiotactic and atactic propylene homopolymers, random propylene copolymers containing at least one comonomer and impact polypropylene copolymers or heterophasic polypropylene copolymers.

The term "thermoplastic" refers to a polymer that becomes liquid when heated, will flow under pressure and solidify when cooled. Thermoplastic polymers include ethylene polymers as well as other polymers commonly used in the plastic industry; non-limiting examples of other polymers commonly used include barrier resins (EVOH), tie resins, polyethylene terephthalate (PET), polyamides and the like.

Figure 2:
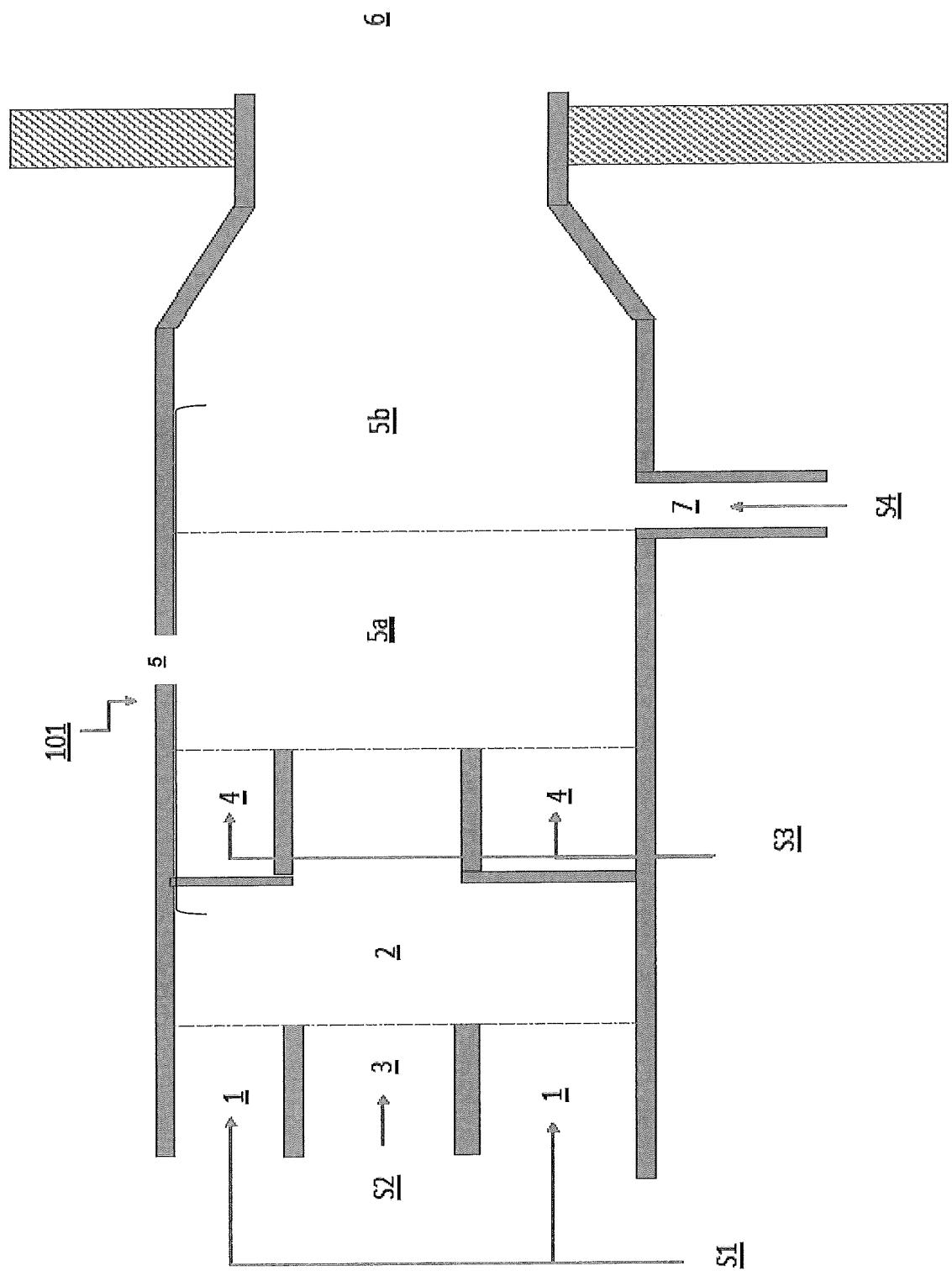
FIG. 2 shows a partial cross section illustration view of an embodiment of the present invention.

With reference to FIG. 1 or 2, in an embodiment of the disclosure, an apparatus, 100 or 101, for the delivery of a multi-component olefin polymerization catalyst to a polymerization reactor includes a first open-ended catalyst component delivery conduit, 1, and a second open-ended catalyst component delivery conduit, 3, which are arranged one within the other, such that the second catalyst component delivery conduit is disposed within the first catalyst component delivery conduit. The first catalyst component catalyst delivery conduit may be considered an outer catalyst component delivery conduit, while the second catalyst component delivery conduit may be considered an inner catalyst component delivery conduit. Each open-ended catalyst component delivery conduit (1 and 3) co-terminates at a common first catalyst component mixing conduit, 2, which is also open-ended.

In an embodiment of the disclosure, the first catalyst component mixing conduit, 2, includes a first tubular section in fluid communication with an open-ended second tubular section which terminates at the second catalyst component mixing conduit, 5.

In an embodiment and with reference to FIG. 1, an open-ended third catalyst component delivery conduit, 4, is disposed within the first catalyst component mixing conduit, 2.

In an embodiment of the disclosure, and with reference to FIG. 1, the first catalyst component mixing conduit, 2, and a third catalyst component delivery conduit, 4, are arranged one within the other, with the third catalyst component delivery conduit being disposed within the first catalyst component mixing conduit. In an embodiment and with reference to FIG. 1, the first catalyst component mixing, 2, and the third catalyst component delivery conduit, 4, co-terminate at a common second catalyst component mixing conduit, 5.

In an embodiment and with reference to FIG. 2, an open-ended third catalyst component delivery conduit, 4, is annularly disposed around the first catalyst component mixing conduit, 2.

In an embodiment of the disclosure, and with reference to FIG. 2, the first catalyst component mixing conduit, 2, and a third catalyst component delivery conduit, 4, are arranged one within the other, with the first catalyst component mixing conduit, 2, being disposed within the third catalyst component delivery conduit, 4. In an embodiment and with reference to FIG. 2, the first catalyst component mixing conduit, 2, and the third catalyst component delivery conduit, 4, co-terminate at a common second catalyst component mixing conduit, 5.

In an embodiment, the first catalyst component mixing conduit and the third catalyst component delivery conduit co-terminate at a second catalyst component mixing conduit, 5, which itself is open-ended.

In an embodiment of the disclosure, the second catalyst component mixing conduit, 5, includes a first tubular section in fluid communication with an open-ended second tubular section which terminates within a polymerization reactor, 6.

In an embodiment, the second catalyst component mixing conduit includes an upstream section, 5a, and a downstream section, 5b. The downstream section, 5b, is open-ended and terminates within a polymerization reactor, 6. With reference to FIG. 1 or 2, the point at which the first catalyst component mixing conduit, 2, and the third catalyst component delivery conduit, 4, co-terminate defines the beginning of the upstream section, 5a, of the second catalyst component mixing conduit.

In an embodiment, an open-ended diluent delivery conduit, 7, is fluidly connected to the second catalyst component mixing conduit. The diluent delivery conduit may be fluidly connected to any part of the upstream section, 5a, or to any part of the downstream section, 5b, of the second catalyst component mixing conduit, 5.

In an embodiment and with reference to FIG. 1 or 2, the point at which the open-ended diluent delivery conduit, 7, is fluidly connected to the second catalyst component mixing conduit defines the beginning of the downstream section, 5b, of the second catalyst component mixing conduit.

In an embodiment of the disclosure, and with reference to FIG. 1 or 2, the first catalyst component delivery conduit, 1, and the second catalyst component delivery conduit, 3, are arranged one within the other, in a substantially coaxial arrangement so that the open ends of the first and second catalyst component delivery conduits co-terminate in a substantially concentric arrangement at the first catalyst component mixing conduit, 2.

In an embodiment of the disclosure, and with reference to FIG. 1 or 2, the first catalyst component mixing conduit, 2, and the third catalyst component delivery conduit, 4, are arranged one within the other, in a substantially coaxial arrangement so that the open ends of the first catalyst component mixing conduit and third catalyst component delivery conduit co-terminate in a substantially concentric arrangement at the second catalyst component mixing conduit, 5.

In an embodiment of the disclosure, and with reference to FIG. 1 or 2, the first catalyst component delivery conduit, 1, the second catalyst component delivery conduit, 3, the first catalyst component mixing conduit, 2, the third catalyst component delivery conduit, 4, and the upstream section of the second catalyst component mixing conduit, 5, are coaxially arranged.

In an embodiment of the disclosure, the first catalyst component delivery conduit, 1, the second catalyst component delivery conduit, 3, and the third catalyst component delivery conduit, 4, are in fluid communication with at least one first catalyst component holding tank, at least one second catalyst component holding tank, and at least one third catalyst component holding tank, respectively.

In an embodiment of the disclosure, the diluent delivery conduit, 7, is in fluid communication with at least one diluent holding tank.

In embodiments of the disclosure, each of the first, second, and third catalyst component delivery conduits, 1, 3, and 4, can have any suitable cross-sectional shape including for example, circular or rectilinear.

In embodiments of the disclosure, each of the first, second, and third catalyst component delivery conduits, 1, 3, and 4, are tubular and have a circular or annular cross section defined by a diameter.

In embodiments of the disclosure, each of the first and second catalyst component mixing conduits, 2 and 5, can have any suitable cross-sectional shape including for example, circular or rectilinear.

In embodiments of the disclosure, each of the first and second catalyst component mixing conduits 2 and 5, are tubular and have a circular or annular cross section defined by a diameter.

In embodiments of the disclosure, the diluent delivery conduit, 7, can have any suitable cross-sectional shape including for example, circular or rectilinear.

In embodiments of the disclosure, the diluent delivery conduit, 7, is tubular and has a circular or annular cross section defined by a diameter.

In an embodiment of the disclosure, at least one first catalyst component (of a multi-component olefin polymerization catalyst) is soluble in a first solvent and is delivered under pressure along with the first solvent to the first catalyst component mixing conduit, 2, via a first catalyst component delivery conduit, 1.

In an embodiment, at least one first catalyst component soluble in a first solvent, is first solubilized in a first solvent in at least one first catalyst component holding tank. The at least one first catalyst component soluble in a first solvent, may then be fed under pressure in solvent, via a first catalyst component delivery conduit, 1, to the first catalyst component mixing conduit, 2, using any pumping means known in the art.

In an embodiment of the disclosure, at least one second catalyst component (of a multi-component olefin polymerization catalyst) is soluble in a second solvent and is delivered under pressure along with the second solvent to the first catalyst component mixing conduit, 2, via a second catalyst component delivery conduit, 3.

In an embodiment, at least one second catalyst component soluble in a second solvent, is first solubilized in a second solvent in at least one second catalyst component holding tank. The at least one second catalyst component soluble in a second solvent, may then be fed under pressure in solvent, via a second catalyst component delivery conduit, 3, to the first catalyst component mixing conduit, 2, using any pumping means known in the art.

In an embodiment of the disclosure, the at least one first catalyst component soluble in the first solvent comes into contact with the at least one second catalyst component soluble in the second solvent within the catalyst component mixing conduit, 2, to form a catalyst support.

In an embodiment of the disclosure, the first catalyst component mixing conduit, 2, receives catalyst components from each of the first, 1, and second, 3, catalyst delivery conduits and has an interior volume in which the catalyst components can mix and react to form a catalyst support. The first catalyst component mixing conduit, 2, can have any suitable shape and dimension and is opened ended so that the at least one first and second catalyst component flows can come into contact with one another for a certain period of time before being expelled from the open end of the first catalyst component mixing conduit, 2, into the second catalyst component mixing conduit, 5.

In an embodiment of the disclosure, at least one third catalyst component (of a multi-component olefin polymerization catalyst) is soluble in a third solvent and is delivered under pressure along with the third solvent to the second catalyst component mixing conduit, 5, via a third catalyst component delivery conduit, 4.

In an embodiment, at least one third catalyst component soluble in a third solvent, is first solubilized in a third solvent in at least one third catalyst component holding tank. The at least one third catalyst component soluble in a third solvent, may then be fed under pressure in solvent, via a third catalyst component delivery conduit, 4, to the second catalyst component mixing conduit, 5, using any pumping means known in the art.

In an embodiment of the disclosure, a catalyst support made in catalyst component mixing conduit, 2, comes into contact with the at least one third catalyst component soluble in the third solvent within the second catalyst component mixing conduit, 5, to form at least one pre-polymerization catalyst.

With reference to FIG. 1 or 2, in an embodiment of the disclosure, the second catalyst component mixing conduit, 5, receives a catalyst support from the first catalyst mixing conduit, 2, and the at least one third catalyst component from the third catalyst delivery conduit, 4, and has an interior volume in which the catalyst support and the at least one third catalyst component can mix and react to form a pre-polymerization catalyst. The second catalyst component mixing conduit, 5, can have any suitable shape and dimension and is opened ended so that the catalyst support and the at least one third catalyst component can come into contact with one another for a certain period of time before being expelled from the open end of second the catalyst component mixing conduit, 5, into the polymerization reactor, 6.

In an embodiment of the disclosure, a diluent is fed through diluent delivery conduit and comes into contact with the pre-polymerization catalyst formed in the second catalyst component mixing conduit, 5, before being expelled from the second catalyst component mixing conduit into an olefin polymerization reactor, 6.

In an embodiment of the disclosure, a diluent is fed through diluent delivery conduit to make contact with the pre-polymerization catalyst in either an upstream section, 5a, or a downstream section, 5b, of the second catalyst component mixing conduit, 5.

In an embodiment of the disclosure, and with reference to FIG. 1 or 2, a diluent is fed through diluent delivery conduit, 7, to make contact with the pre-polymerization catalyst in a downstream section, 5b, of the second catalyst component mixing conduit, 5.

In an embodiment of the disclosure, the downstream section, 5b, of second catalyst component mixing conduit, 5, includes a conical section in fluid communication with an open-ended tubular section which terminates within the polymerization reactor, the conical section tapering inwardly to meet the open-ended tubular section.

In an embodiment of the disclosure, the downstream section, 5b, of the second catalyst component mixing conduit, 5, includes a first tubular section having a first annular cross section defined by a first diameter, which is in fluid communication with an open-ended second tubular section which terminates within the polymerization reactor and has a second annular cross section which is defined by a second diameter which is smaller than the first diameter.

In an embodiment of the disclosure, the downstream section, 5b, of the second catalyst component mixing conduit, 5, includes a first tubular section having a first annular cross section defined by a first diameter, which is in fluid communication with an open-ended second tubular section which terminates within the polymerization reactor and has a second annular cross section which is defined by a second diameter, wherein the first diameter is from 1.05 to 5 times larger than the second diameter.

In an embodiment of the disclosure, the downstream section, 5b, of the second catalyst component mixing conduit, 5, includes a first tubular section having a first annular cross section defined by a diameter of from 0.8 to 25 inches, which is in fluid communication with an open-ended second tubular section which terminates within the polymerization reactor and has a second annular cross section which is defined by a diameter of from 0.75 to 5 inches.

In an embodiment, the period of time within the first catalyst component mixing conduit, 2, during which catalyst components fed from the first and second catalyst component delivery conduits, 1 and 3, come into contact with each other and can react (optionally to form a catalyst support) prior to them being expelled from the first catalyst component mixing conduit, 2, into the second catalyst component mixing conduit, 5, may in the present disclosure, be called the "first hold-up time" or "HUT1". By way of providing a non-limiting example only, a first catalyst component mixing conduit having a larger interior volume, will provide a longer first hold-up time for the polymerization catalyst support components to mix and react, for a given flow rate of catalyst components into the first catalyst component mixing conduit.

In an embodiment of the disclosure, the first hold-up time, HUT1, is from 10 seconds to 90 seconds. In another embodiment, the first hold-up time, HUT1, is from of 20 seconds to 50 seconds.

In an embodiment, the period of time within the second catalyst component mixing conduit, 5, during which catalyst components fed from the first catalyst component mixing conduit, 2, and the third catalyst component delivery conduit, 4, come into contact with each other and can react (optionally to form a pre-polymerization catalyst) prior to them being expelled from the second catalyst component mixing conduit into a polymerization reactor, may in the present disclosure, be called the "second hold-up time" or "HUT2". By way of providing a non-limiting example only, a second catalyst component mixing conduit having a larger interior volume, will provide a longer second hold-up time for the polymerization catalyst components to mix and react, for a given flow rate of catalyst components into the second catalyst component mixing conduit. Alternatively, the second hold-up time, HUT2, may be partitioned according to whether mixing is occurring in an upstream section, 5a, of the second catalyst component mixing conduit or in a downstream section, 5b, of a second catalyst component mixing conduit, 2. The period of time within the upstream section, 5a, during which catalyst components fed from the first catalyst component mixing conduit, 2, and the third catalyst component delivery conduit, 4, come into contact with each other (optionally to form a pre-polymerization catalyst), but prior to them entering the downstream section, 5b, may be called the "second hold-up time" or "HUT2". The period of time within the downstream section, 5b, prior to the polymerization catalyst components (or optionally a pre-polymerization catalyst) being expelled into a polymerization reactor, 6, may be called the "hold-up time 3" or "HUT3". Where the diluent delivery conduit, 7, defines the beginning of the downstream section, 5b, of the second catalyst mixing conduit, 5 (as discussed above), the period of time within the downstream section during which catalyst components (or optionally a pre-polymerization catalyst) come into contact with a diluent and prior to being expelled into a polymerization reactor, 6, may be called the "hold-up time 3" or "HUT3".

In embodiments of the disclosure, the HUT2 is from 1 to 100 seconds, or from 1 to 50 seconds, or from 1 to 25 seconds, or from 5 to 50 seconds, or from 5 to 40 seconds, or from 5 to 35 seconds.

In embodiments of the disclosure, the HUT3 is from 1 to 50 seconds, or from 1 to 25 seconds, or from 1 to 20 seconds, or from 1 to 15 seconds, or from 1 to 10 seconds, or from 1 to 5 seconds.

The olefin polymerization reactor, 6, employed with the present disclosure can be of any type known to persons skilled in the art. Some non-limiting examples of well-known olefin polymerization reactors include for example, fluidized bed reactors, loop reactors, and stirred tank reactors.

In an embodiment of the disclosure, the olefin polymerization reactor is a solution phase polymerization reactor.

In an embodiment of the disclosure, the polymerization reactor is used to polymerize olefins in the solution phase.

In an embodiment of the disclosure, the polymerization reactor is used to polymerize ethylene and optionally one or more alpha-olefins in the solution phase.

In an embodiment of the disclosure, the olefin polymerization reactor is a stirred tank reactor.

In an embodiment, the olefin polymerization reactor is a stirred tank reactor having a bottom wall defining an interior bottom wall surface, a top wall defining an interior top wall surface, and a continuous side wall extending upwardly form the bottom wall to the top wall and defining an interior side wall surface.

In an embodiment of the disclosure, the apparatus, 100 or 101, may be positioned such that a portion of the second catalyst component mixing conduit, 5, penetrates any polymerization reactor wall.

In an embodiment of the disclosure, the apparatus, 100 or 101, may be positioned such that a portion of the second catalyst component mixing conduit, 5, penetrates any polymerization reactor wall to any unspecified depth.

In an embodiment of the disclosure, the apparatus, 100 or 101, may be positioned such that the downstream section, 5b, of the second catalyst component mixing conduit, 5, extends through a continuous side wall of a stirred tank reactor.

In an embodiment of the disclosure, the apparatus, 100 or 101, may be positioned such that the downstream section, 5b, of the second catalyst component mixing conduit, 5, extends through a bottom wall of a stirred tank reactor.

In an embodiment of the disclosure, the apparatus, 100 or 101, may be positioned such that the downstream section, 5b, of the second catalyst component mixing conduit, 5, extends through a top wall of a stirred tank reactor.

In an embodiment of the disclosure, the first catalyst component delivery conduit, 1, the second catalyst component delivery conduit, 3, the first catalyst component mixing conduit, 2, the third catalyst component delivery conduit, 4, and the upstream section, 5a, of the second catalyst component mixing conduit, 5, are disposed substantially vertically.

In an embodiment of the disclosure, the upstream section, 5a, and the downstream section, 5b, of the second catalyst component mixing conduit are arranged substantially perpendicularly to one another.

In an embodiment of the disclosure, the upstream section, 5a, and the downstream section, 5b, of the second catalyst component mixing conduit are arranged substantially perpendicularly to one another, with the upstream section, 5a, being substantially vertically disposed and the downstream section, 5b, being substantially horizontally disposed.

In an embodiment of the disclosure, a method for the delivery of a multi-component olefin polymerization catalyst to a polymerization reactor, includes: feeding at least one first catalyst component soluble in a first solvent to a first catalyst component mixing conduit via a first catalyst component delivery conduit, feeding at least one second catalyst component soluble in a second solvent to the first catalyst component mixing conduit via a second catalyst component delivery conduit which is disposed within the first catalyst component delivery conduit, feeding at least one third catalyst component soluble in a third solvent to an upstream section of a second catalyst component mixing conduit including an upstream section and a downstream section via a third catalyst component delivery conduit which is disposed within the first catalyst component mixing conduit, and feeding at least one diluent to the downstream section of the second catalyst mixing conduit via a diluent delivery conduit; wherein, the at least one first catalyst component soluble in the first solvent and the at least one second catalyst component soluble in the second solvent come into contact with one another within the first catalyst component mixing conduit to form a catalyst support, the at least one third catalyst component soluble in the third solvent and the catalyst support come into contact with one another within the upstream section of the second catalyst component mixing conduit to form a pre-polymerization catalyst, and the at least one diluent comes in contact with the pre-polymerization catalyst within the downstream section of the second catalyst component mixing conduit before being expelled into the polymerization reactor.

In an embodiment of the disclosure, a method for the delivery of a multi-component olefin polymerization catalyst to a polymerization reactor, includes: feeding at least one first catalyst component soluble in a first solvent to a first catalyst component mixing conduit via a first catalyst component delivery conduit, feeding at least one second catalyst component soluble in a second solvent to the first catalyst component mixing conduit via a second catalyst component delivery conduit which is disposed within the first catalyst component delivery conduit, feeding at least one third catalyst component soluble in a third solvent to an upstream section of a second catalyst component mixing conduit including an upstream section and a downstream section via a third catalyst component delivery conduit which is annularly disposed around the first catalyst component mixing conduit, and feeding at least one diluent to the downstream section of the second catalyst mixing conduit via a diluent delivery conduit; wherein, the at least one first catalyst component soluble in the first solvent and the at least one second catalyst component soluble in the second solvent come into contact with one another within the first catalyst component mixing conduit to form a catalyst support, the at least one third catalyst component soluble in the third solvent and the catalyst support come into contact with one another within the upstream section of the second catalyst component mixing conduit to form a pre-polymerization catalyst, and the at least one diluent comes in contact with the pre-polymerization catalyst within the downstream section of the second catalyst component mixing conduit before being expelled into the polymerization reactor.

In an embodiment of the disclosure, the method further includes feeding at least one fourth catalyst component soluble in a fourth solvent to the downstream section of the second catalyst mixing conduit via the diluent delivery conduit.

In an embodiment of the disclosure, the method further includes feeding at least one fourth catalyst component soluble in a fourth solvent to either the upstream section or the downstream section of the second catalyst mixing conduit via a fourth catalyst component delivery conduit.

The Multi Component Olefin Polymerization Catalyst

The polymerization catalyst employed in the present disclosure is a multi-component olefin polymerization catalyst. The catalyst components which make up the multi-component olefin polymerization catalyst are not limited, and a wide variety of catalyst components can be used, provided that they are useful for forming an active olefin polymerization catalyst.

In an embodiment of the disclosure, the multi-component olefin polymerization catalyst is a Ziegler-Natta catalyst.

A wide variety of compounds can be used to synthesize an active Ziegler-Natta catalyst system. The following describes various compounds that may be combined to produce an active Ziegler-Natta catalyst system. Those skilled in the art will understand that the embodiments in this disclosure are not limited to the specific compounds disclosed.

In an embodiment of the disclosure, a Ziegler-Natta catalyst includes at least the following catalyst components: (i) a halide compound; (ii) an organomagnesium compound; and (iii) a transition metal compound. Such a Ziegler-Natta catalyst may be called a "pre-polymerization" catalyst. In addition to catalyst components (i), (ii) and (iii), an additional catalyst component, (iv), which is a co-catalyst component may be added to a Ziegler-Natta catalyst formulation in order to increase the activity of the Ziegler-Natta catalyst toward olefin polymerization.

In an embodiment, the additional catalyst component, (iv), is an organoaluminum co-catalyst.

The halide compound, (i), may be a $C_{1-10}$ alkyl halide in which the halide will react with the organomagnesium compound. The alkyl group may be branched or straight chained.

In an embodiment, the halide compound is a chloride compound.

In an embodiment of the disclosure, the halide compound, (i), has the formula $R^2Cl$; wherein $R^2$ represents a hydrogen atom, or a linear, branched or cyclic hydrocarbyl radical containing 1 to 10 carbon atoms.

In one embodiment, the halide compound is t-butyl chloride, tBuCl.

In an embodiment of the disclosure, the organomagnesium compound (ii) has the formula $Mg(R^3)_2$ in which each $R^3$ may be the same or different, linear, branched or cyclic hydrocarbyl radicals containing 1 to 10 carbon atoms. In an embodiment, $R^3$ is selected from a $C_{1-4}$ alkyl radicals. In some embodiments, the organomagnesium compound may be chosen from diethyl magnesium, dibutyl magnesium and ethyl butyl magnesium and mixtures thereof.

In an embodiment of the disclosure, the transition metal compound, (iii), has the formula $M(X)_n$ or $MO(X)_n$; where M represents a metal selected from Group 4 through Group 8 of the Periodic Table, or mixtures of metals selected from Group 4 through Group 8; O represents oxygen, and X represents chloride or bromide; n is an integer from 3 to 6 that satisfies the oxidation state of the metal. Additional non-limiting examples of suitable transition metal compounds include Group 4 to Group 8 metal alkyls, metal alkoxides (which may be prepared by reacting a metal alkyl with an alcohol) and mixed-ligand metal compounds that contain a mixture of halide, alkyl and alkoxide ligands.

In an embodiment of the disclosure, the transition metal compound (iii) has the formula:

$$Ti((O)_a R^1)_b X_c$$

wherein $R^1$ is chosen from $C_{6-10}$ alkyl radicals, $C_{6-10}$ aromatic radicals and mixtures thereof, X is chosen from a chlorine atom and a bromine atom, a is 0 or 1, b is 0 or an integer up to 4 and c is 0 or an integer up to 4 and the sum of b+c is the valence of the Ti atom. In some embodiments, X is a chlorine atom. In some embodiments, $R^1$ if present is a $C_{1-6}$ alkyl radical. In some embodiments, $R^1$ if present is a $C_{1-4}$ alkyl radical. In some embodiments, the titanium compound may be a titanium alkoxide, for example where b is at least 1 and a is at least 1, and c is a number of 3 or less. In some embodiments b is 4 and all a's are 1.

In an embodiment, the transition metal compound, (iii), is titanium tetrachloride, $TiCl_4$.

In an embodiment of the disclosure, the organoaluminum co-catalyst, (iv), has the formula:

$$Al(R^4)_p(OR^9)_q(X)_r$$

wherein the $R^4$ groups may be the same or different, hydrocarbyl groups having from 1 to 10 carbon atoms; the $OR^9$ groups may be the same or different, alkoxy or aryloxy groups wherein $R^9$ is a hydrocarbyl group having from 1 to 10 carbon atoms bonded to oxygen; X is chloride or bromide; and (p+q+r)=3, with the proviso that p is greater than 0.

In an embodiment of the disclosure, the organoaluminum co-catalyst, (iv), is a trialkylaluminum compound.

In embodiments of the disclosure, the organoaluminum co-catalyst, (iv), is chosen from trimethyl aluminum, triethyl aluminum, tributyl aluminum, dimethyl aluminum methoxide, diethyl aluminum ethoxide, dibutyl aluminum butoxide, dimethyl aluminum chloride or bromide, diethyl aluminum chloride or bromide, dibutyl aluminum chloride or bromide, ethyl aluminum dichloride or dibromide, and mixtures thereof.

In cases where the organomagnesium compound is not readily soluble in the solvent of choice for the catalyst preparation, it may be desirable to add a solubilizing compound such as an organoaluminum or organozinc compound prior to use. Such compounds are discussed in, for example, U.S. Pat. Nos. 4,127,507 and 4,250,288. Alternatively, where organomagnesium compounds provide solutions which are overly viscous in solvents or diluents of choice, solubilizers such as organoaluminum or organozinc may be used to decrease the viscosity of the solution.

In one embodiment, the solubilizing agent or viscosity modifier, (v), is an organoaluminum compound which may be of the formula:

$$Al^1 R_d^5 X_{3-d}$$

wherein each $R^5$ is independently selected from alkyl groups having 1-10 carbon atoms, d is 1-3, and X is a halogen atom, such as a chlorine atom. In some embodiments, $R^5$ is an alkyl radical having from 1 to 4 carbon atoms. In some embodiments, d is 3, and there are no halogen substituents in the first aluminum compound.

In an embodiment, the solubilizing agent or viscosity modifier, (v), is tri-ethyl aluminum.

A non-limiting example of an active in-line Ziegler-Natta catalyst system can be prepared as follows. In a first step, a solution of an organomagensium, (ii), is reacted with a solution of a halide compound, (i), to form a magnesium chloride catalyst support suspended in solution. In the first step, the solution of organomagnesium compound may also contain an organoaluminum compound, (v). In a second step, a solution of the transition metal compound, (iii), is added to the magnesium chloride support and the transition metal compound is supported on the magnesium chloride to give a pre-polymerization catalyst. In a third and final step, a solution of an organoaluminum co-catalyst, (iv), is added to the transition metal compound supported on the magnesium chloride (i.e., to the pre-polymerization catalyst) to give the final polymerization catalyst.

To produce an active Ziegler-Natta catalyst system the quantity and mole ratios of the components, (i) through (v), are optimized as is well known to persons skilled in the art. For example, to produce an efficient in-line Ziegler-Natta catalyst formulation the following molar ratios may be optimized: halide compound (i)/organomagnesium compound (ii); organomagnesium compound (ii)/transition metal compound (iii); organoaluminum co-catalyst (iv)/transition metal compound (iii); viscosity modifier (v)/organomagnesium compound (ii); viscosity modifier (v)/transition metal compound (iii). Further, the time that these components have to react and equilibrate may be optimized.

Without wishing to be bound by any single theory, by separately feeding catalyst components (i) and (ii) which give rise to a magnesium chloride catalyst support, to a first catalyst component mixing conduit, 2, it can be ensured that catalyst support is formed at sufficiently high rates and with reduced formation of catalyst support near the walls of the mixing apparatus where fouling and/or plugging could occur. In a coaxial injection arrangement, this can be enhanced by ensuring that the two catalyst component flows being mixed have a Craya-Curtet flow in a specific range. Similarly, by separately feeding the catalyst component (iii), which when combined with the magnesium chloride catalyst support gives rise to a Ziegler-Natta pre-polymerization catalyst, to a second catalyst component mixing conduit, 5, it can be ensured that the pre-polymerization catalyst is formed at sufficiently high rates and with reduced formation of pre-polymerization catalyst near the walls of the mixing apparatus where fouling and/or plugging could occur. In a coaxial injection arrangement, this can be facilitated by ensuring that the flow of catalyst components from the first catalyst component mixing tube (i.e., the components forming the catalyst support) and being mixed with catalyst component (iii) have a Craya-Curtet flow in a specific range. Craya-Curtet flows are formed when a jet with moderately large Reynolds number discharges into a coaxial ducted flow of much larger radius. It is seen that the Craya-Curtet number, C, is defined as the square root of the ratio of the momentum flux of the coflowing stream to that of the central jet (see, for example Revuelta et al., Laminar Craya-Curtet Jets, Physics of Fluids, 16, 208 (2004)):

$$C = \left(\frac{J_c}{J_j}\right)^{\frac{1}{2}}$$

In an embodiment of the disclosure, the specific range for C which prevents a circulation from forming and reduces fouling when mixing catalyst components (i) and (ii) in a catalyst component mixing conduit, 2, is $0.65 \leq C \leq 2.5$. In another embodiment of the disclosure, the specific range for C which prevents a circulation from forming and reduces fouling when mixing catalyst components (i) and (ii) in a catalyst component mixing conduit, 2, is $0.75 \leq C \leq 1.5$.

In an embodiment of the disclosure, the specific range for C which prevents a circulation from forming and reduces fouling when mixing catalyst components from the first catalyst component mixing tube (i.e., the components forming the catalyst support) and catalyst component (iii) in a catalyst component mixing conduit, 5, is $0.65 \leq C \leq 2.5$. In another embodiment of the disclosure, the specific range for C which prevents a circulation from forming and reduces fouling when mixing catalyst components from the first catalyst component mixing tube (i.e., the components forming the catalyst support) and catalyst component (iii) in a catalyst component mixing conduit, 5, is $0.75 \leq C \leq 1.5$.

In embodiments of the disclosure, the upper limit on the solubilizing agent or viscosity modifier (v)/organomagnesium compound (ii) molar ratio may be about 70, in some cases about 50 and is other cases about 30. In embodiments of the disclosure, the lower limit on the solubilizing agent or viscosity modifier (v)/organomagnesium compound (ii) molar ratio may be about 3.0, in some cases about 5.0 and in other cases about 10.

In embodiments of the disclosure, the upper limit on the halide compound (i)/organomagnesium compound (ii) molar ratio may be about 4, in some cases about 3.5 and is other cases about 3.0. In embodiments of the disclosure, the lower limit on the halide compound (i)/organomagnesium compound (ii) molar ratio may be about 1.0, in some cases about 1.5 and in other cases about 1.9.

In embodiments of the disclosure, the upper limit on the organoaluminum co-catalyst (iv)/transition metal compound (iii) molar ratio may be about 10, in some cases about 7.5 and is other cases about 6.0. In embodiments of the disclosure, the lower limit on the organoaluminum co-catalyst (iv)/transition metal compound (iii) molar ratio may be 0, in some cases about 1.0 and in other cases about 2.0.

In embodiments of the disclosure, the upper limit on the solubilizing agent or viscosity modifier (v)/transition metal compound (iii) molar ratio may be about 2, in some cases about 1.5 and is other cases about 1.0. In embodiments of the disclosure, the lower limit on the solubilizing agent or viscosity modifier (v)/transition metal compound (iii) molar ratio may be about 0.05, in some cases about 0.075 and in other cases about 0.1.

In an embodiment of the disclosure, the time period during which a halide compound and an organomagnesium compound come into contact with one another, and before the addition of a transition metal compound can be called the first hold-up time, HUT1. In an embodiment of the disclosure, the time period during which a halide compound and an organomagnesium compound come into contact with one another within a first catalyst component mixing conduit, 2, and before their entry into a second catalyst component mixing conduit, 5, can be called the first hold-up time, HUT1. During HUT1, the halide compound and the organomagnesium compound react to form a magnesium halide which serves as a catalyst support material.

In an embodiment of the disclosure, the time period during which a transition metal compound comes into contact with a magnesium halide support and before the addition of a diluent can be called the second hold-up time, HUT2. In an embodiment, the time period during which a transition metal compound comes into contact with a magnesium halide support, in a second catalyst component mixing conduit, 5, and before the addition of a diluent to the second catalyst component mixing conduit, 5, can be called the second hold-up time, HUT2. During HUT2, the transition metal compound makes contact with the magnesium halide support to form a pre-polymerization catalyst.

In an embodiment of the disclosure, the time period during which a diluent comes into contact with a pre-polymerization catalyst and before the pre-polymerization catalyst enters into a polymerization reactor may be called the third hold-up time, HUT3. In an embodiment, the time period during which a diluent comes into contact with a pre-polymerization catalyst, in a second catalyst component mixing conduit, 5, and before the pre-polymerization catalyst enters into a polymerization reactor may be called the third hold-up time, HUT3.

In an embodiment of the invention, the time period during which an organoaluminum co-catalyst comes into contact with a pre-polymerization catalyst and before all catalyst components enter into a polymerization reactor may be called the third hold-up time, HUT3. In an embodiment of the invention, the time period during which an organoaluminum co-catalyst comes into contact with a pre-polymerization catalyst, in a second catalyst component mixing conduit, 5, and before all catalyst components enter into the polymerization reactor, 6, may be called the third hold-up time, HUT3.

A person skilled in the art will recognize that each hold-up time can be manipulated by changing catalyst component flow rates, conduit dimensions and the like.

The process to synthesize an active in-line Ziegler-Natta catalyst system can be carried out in a variety of solvents; non-limiting examples of solvents include linear or branched $C_5$ to $C_{12}$ alkanes or mixtures thereof.

In embodiments of the disclosure, the first solvent, the second solvent, the third solvent, the diluent, and the (optional) fourth solvent, may be the same or different and are selected from hydrocarbons, hydrocarbon mixtures, including linear or branched $C_5$ to $C_{12}$ alkanes or mixtures thereof. In further non-limiting embodiments, the solvents and diluents can be selected from the group including linear, branched or cyclic $C_{5-12}$ aliphatic hydrocarbons, such as pentane, methyl pentane, hexane, heptane, octane, cyclohexane, methylcyclohexane, hydrogenated naphtha or combinations thereof. In further non-limiting embodiments, the solvents and diluents can be selected from the group including benzene, toluene (methylbenzene), ethylbenzene, o-xylene (1,2-dimethylbenzene), m-xylene (1,3-dimethylbenzene), p-xylene (1,4-dimethylbenzene), mixtures of xylene isomers, hemellitene (1,2,3-trimethylbenzene), pseudocumene (1,2,4-trimethylbenzene), mesitylene (1,3,5-trimethylbenzene), mixtures of trimethylbenzene isomers, prehenitene (1,2,3,4-tetramethylbenzene), durene (1,2,3,5-tetramethylbenzene), mixtures of tetramethylbenzene isomers, pentamethylbenzene, hexamethylbenzene and combinations thereof.

In embodiments of the disclosure, the first solvent, the second solvent, the third solvent, the diluent, and the (optional) fourth solvent are each selected from one or more than one methylpentane isomer.

In embodiments of the disclosure, at least one of the first solvent, the second solvent, the third solvent, the diluent, and the (optional) fourth solvent are 2-methylpentane (also known as isohexane).

In an embodiment of the disclosure, the first solvent, the second solvent, the third solvent, the diluent, and the (optional) fourth solvent are each 2-methylpentane (also known as isohexane).

In an embodiment of the disclosure, at least one first catalyst component is soluble in a first solvent and includes a halide compound, (i). In an embodiment of the disclosure, at least one first catalyst component is soluble in a first solvent and includes a chloride compound. In an embodiment of the disclosure, at least one first catalyst component is soluble in a first solvent and includes an organochloride compound, (i), having the formula $R^2Cl$; wherein $R^2$ represents a hydrogen atom, or a linear, branched or cyclic hydrocarbyl radical containing 1 to 10 carbon atoms. In an embodiment of the disclosure, at least one first catalyst component is soluble in a first solvent and includes tert-butyl chloride, $(CH_3)_3CCl$.

In an embodiment of the disclosure, at least one first catalyst component is soluble in a first solvent and includes an organomagnesium compound, (ii). In an embodiment of the disclosure, at least one first catalyst component is soluble in a first solvent and includes an organomagnesium compound, (ii), having the formula $Mg(R^3)_2$ in which each $R^3$ may be the same or different, linear, branched or cyclic hydrocarbyl radicals containing 1 to 10 carbon atoms. In an embodiment of the disclosure, at least one first catalyst component is soluble in a first solvent and includes ethyl butyl magnesium (n-BuylMgEt).

In an embodiment of the disclosure, at least one first catalyst component is soluble in a first solvent and includes an organomagnesium compound, (ii), and a solubilizing agent or viscosity modifier, (v). In an embodiment of the disclosure, at least one first catalyst component is soluble in a first solvent and includes an organomagnesium compound, (ii), having the formula $Mg(R^3)_2$ in which each $R^3$ may be the same or different, linear, branched or cyclic hydrocarbyl radicals containing 1 to 10 carbon atoms and a solubilizing agent or viscosity modifier, (v), having the formula $Al^1R^5{}_dX_{3-d}$ wherein each $R^5$ is independently selected from alkyl groups having 1-10 carbon atoms, d is 1-3, and X is a halogen atom, such as a chlorine atom. In an embodiment of the disclosure, at least one first catalyst component is soluble in a first solvent and includes ethyl butyl magnesium and triethylaluminum.

In an embodiment of the disclosure, the first solvent is 2-methyl-pentane.

In an embodiment of the disclosure, at least one second catalyst component is soluble in a second solvent and includes a halide compound, (i). In an embodiment of the disclosure, at least one second catalyst component is soluble in a second solvent and includes a chloride compound. In an embodiment of the disclosure, at least one second catalyst component is soluble in a second solvent and includes an organochloride compound having the formula $R^2Cl$; wherein $R^2$ represents a hydrogen atom, or a linear, branched or cyclic hydrocarbyl radical containing 1 to 10 carbon atoms. In an embodiment of the disclosure, at least one second catalyst component is soluble in a second solvent and includes tert-butyl chloride, $(CH_3)_3CCl$.

In an embodiment of the disclosure, at least one second catalyst component is soluble in a second solvent and includes an organomagnesium compound, (ii). In an embodiment of the disclosure, at least one second catalyst component is soluble in a second solvent and includes an organomagnesium compound, (ii), having the formula $Mg(R^3)_2$ in which each $R^3$ may be the same or different, linear, branched or cyclic hydrocarbyl radicals containing 1 to 10 carbon atoms. In an embodiment of the disclosure, at least one second catalyst component is soluble in a second solvent and includes ethyl butyl magnesium (n-BuylMgEt).

In an embodiment of the disclosure, at least one second catalyst component is soluble in a second solvent and includes an organomagnesium compound, (ii), and a solubilizing agent or viscosity modifier, (v). In an embodiment of the disclosure, at least one second catalyst component is soluble in a second solvent and includes an organomagnesium compound, (ii), having the formula $Mg(R^3)_2$ in which each $R^3$ may be the same or different, linear, branched or cyclic hydrocarbyl radicals containing 1 to 10 carbon atoms and a solubilizing agent or viscosity modifier, (v), having the formula $Al^1R^5{}_dX_{3-d}$ wherein each $R^5$ is independently selected from alkyl groups having 1-10 carbon atoms, d is 1-3, and X is a halogen atom, such as a chlorine atom. In an embodiment of the disclosure, at least one second catalyst component is soluble in a second solvent and includes ethyl butyl magnesium and triethylaluminum.

In an embodiment of the disclosure, the second solvent is 2-methyl-pentane.

In an embodiment of the disclosure, at least one third catalyst component is soluble in a third solvent and includes a transition metal compound, (iii). In an embodiment of the disclosure, at least one third catalyst component is soluble in a third solvent and includes a transition metal compound, (iii), having the formula $M(X)n$ or $MO(X)n$; where M represents a metal selected from Group 4 through Group 8 of the Periodic Table, or mixtures of metals selected from Group 4 through Group 8; O represents oxygen; and X represents chloride or bromide; n is an integer from 3 to 6 that satisfies the oxidation state of the metal. In an embodiment of the disclosure, at least one third catalyst component is soluble in a third solvent and includes titanium tetrachloride, $TiCl_4$.

In an embodiment of the disclosure, the third solvent is 2-methyl-pentane.

In an embodiment of the disclosure, at least one fourth catalyst component is soluble in a fourth solvent and includes an organoaluminum co-catalyst, (iv). In an embodiment of the disclosure, at least one fourth catalyst component is soluble in a fourth solvent and includes an organoaluminum co-catalyst, (iv), having the formula $Al(R^4)_p(OR^9)_q(X)_r$ wherein the $R^4$ groups may be the same or different, hydrocarbyl groups having from 1 to 10 carbon atoms; the $OR^9$ groups may be the same or different, alkoxy or aryloxy groups wherein $R^9$ is a hydrocarbyl group having from 1 to 10 carbon atoms bonded to oxygen; X is chloride or bromide, and; (p+q+r)=3, with the proviso that p is greater than 0. In an embodiment of the disclosure, at least one fourth catalyst component is soluble in a fourth solvent and includes diethylaluminum ethoxide, $(C_2H_5)_2AlOC_2H_5$.

In an embodiment of the disclosure, the fourth solvent is 2-methyl-pentane.

In an embodiment of the disclosure, at least one first catalyst component includes a halide compound, (i), and is soluble in a first solvent and is delivered under pressure along with the first solvent to a first catalyst component mixing conduit, 2, via a first catalyst component delivery conduit, 1, and at least one second catalyst component includes an organomagnesium compound, (ii), and is soluble in a second solvent and is delivered under pressure along with the second solvent to the first catalyst component mixing conduit, 2, via a second catalyst component delivery conduit, 1.

In an embodiment of the disclosure, at least one first catalyst component includes an organomagnesium compound, (ii), and is soluble in a first solvent and is delivered under pressure along with the first solvent to a first catalyst component mixing conduit, 2, via a first catalyst component delivery conduit, 1, and at least one second catalyst component includes a halide compound, (i), and is soluble in a second solvent and is delivered under pressure along with the second solvent to the first catalyst component mixing conduit, 2, via a second catalyst component delivery conduit, 3.

In an embodiment of the disclosure, at least one third catalyst component includes a transition metal compound, (iii), and is soluble in a third solvent and is delivered under pressure along with the third solvent to a second catalyst component mixing conduit, 5, via a third catalyst component delivery conduit, 4.

In an embodiment of the disclosure, at least one third catalyst component includes a transition metal compound, (iii), and is soluble in a third solvent and is delivered under pressure along with the third solvent to an upstream section, 5a, of a second catalyst component mixing conduit, 5, via a third catalyst component delivery conduit, 4.

In an embodiment of the disclosure, at least one diluent is delivered under pressure to a second catalyst component mixing conduit, 5, via a diluent delivery conduit, 7.

In an embodiment of the disclosure, at least one diluent is delivered under pressure to a downstream section, 5b, of a second catalyst component mixing conduit, 5, via a diluent delivery conduit, 7.

In an embodiment of the disclosure, at least one diluent is delivered under pressure to an upstream section, 5a, of a second catalyst component mixing conduit, 5, via a diluent delivery conduit, 7.

In an embodiment of the disclosure, at least one fourth catalyst component includes an organoaluminum co-catalyst, (iv), and is soluble in a fourth solvent and is delivered under pressure to a second catalyst component mixing conduit, 5, via a diluent delivery conduit, 7.

In an embodiment of the disclosure, at least one fourth catalyst component includes an organoaluminum co-catalyst, (iv), and is soluble in a fourth solvent and is delivered under pressure to an upstream section, 5a, of a second catalyst component mixing conduit, 5, via a diluent delivery conduit, 7.

In an embodiment of the disclosure, at least one fourth catalyst component includes an organoaluminum co-catalyst, (iv), and is soluble in a fourth solvent and is delivered under pressure to a downstream section, 5b, of a second catalyst component mixing conduit, 5, via a diluent delivery conduit, 7.

In an embodiment of the disclosure, at least one fourth catalyst component includes an organoaluminum co-catalyst, (iv), and is soluble in a fourth solvent and is delivered under pressure to a second catalyst component mixing conduit, 5, via a fourth catalyst component delivery conduit, 7.

In an embodiment of the disclosure, at least one fourth catalyst component includes an organoaluminum co-catalyst, (iv), and is soluble in a fourth solvent and is delivered under pressure to an upstream section, 5a, of a second catalyst component mixing conduit, 5, via a fourth catalyst component delivery conduit, 7.

In an embodiment of the disclosure, at least one fourth catalyst component includes an organoaluminum co-catalyst (iv) and is soluble in a fourth solvent and is delivered under pressure to a downstream section, 5b of a second catalyst component mixing conduit, 5, via a fourth catalyst component delivery conduit, 7. In an embodiment of the disclosure, the polymerization takes place in a solution phase polymerization reactor in which the solvent used is a hydrocarbon.

In an embodiment of the disclosure, the polymerization takes place in a solution phase polymerization reactor in which the solvent used is 2-methylpentane.

In embodiments of the disclosure, the method and apparatus, 100 or 101, may, in particular, be usefully employed in dual reactor systems, such as in-series dual reactor systems. For example, dual reactor systems which include slurry phase polymerization reactor systems, solution phase polymerization reactor systems and combinations thereof may be employed with the current disclosure. Further, gas phase or slurry phase polymerization reactor systems may also be used with the process of the current disclosure.

In an embodiment of the disclosure, polymerization takes place in two reactors which are configured in series. The reactors can be the same or different. For example, the reactors can each be continuously stirred tank reactors suitable for solution polymerization. The reactors can be operated under common or different conditions. For example, the reactors can be operated under conditions which promote the formation of a high molecular weight polymer fraction in a first (i.e., upstream) reactor and the formation of a low molecular weight polymer fraction in a second (i.e., downstream) reactor which receives an effluent stream from the first reactor.

Slurry polymerization is well known in the art. The polymerization is conducted in an inert diluent in which the resulting polymer is not soluble. The monomers may be soluble in the diluent. The diluent is typically a hydrocarbyl compound such as a $C_{5-12}$ hydrocarbon that may be unsubstituted or substituted by a $C_{1-4}$ alkyl radical. Some potential diluents include pentane, hexane, heptane, octane, isobutene cyclohexane and methylcyclohexane. The diluent may be hydrogenated naphtha. The diluent may also be a $C_{8-12}$ aromatic hydrocarbon such as that sold by ExxonMobil Chemical under the trademark ISOPAR® E. Typically, monomers are dispersed or dissolved in the diluent. The polymerization reaction takes place at temperatures from about 20° C. to about 120° C., such as from about 40° C. to 100° C. The pressure in the reactor may be from about 15 psi to about 4,500 psi, such as from about 100 psi to 1,500 psi. The reactors may be stirred tank or "loop" reactors with a settling leg to remove product polymer. Stirred tank reactors may also be used. The solids content of the suspension is generally in the range from 10% to 80%. The polymerization can be carried out either batchwise, e.g., in stirring autoclaves, or continuously, e.g., in tube reactors, or in loop reactors.

In gas phase polymerization, pressures can be in the range of 25 psi to 1000 psi, such as 50 psi to 500 psi or 100 psi to 450 psi, and temperatures will be in the range of from 30° C. to 130° C., such as 65° C. to 115° C. Stirred or fluidized bed gas phase reactors can be used. In the gas phase fluidized bed polymerization of olefins, the polymerization is conducted in a fluidized bed reactor wherein a bed of polymer particles are maintained in a fluidized state by means of an ascending gas stream including the gaseous reaction monomer. The polymerization of olefins in a stirred bed reactor differs from polymerization in a gas fluidized bed reactor by the action of a mechanical stirrer within the reaction zone that contributes to fluidization of the bed. The gas phase polymerization may be conducted in dry mode, condensed mode or super condensed mode, all of which are well known in the art.

Polymerization may take place in the presence of a non-polymerizable gas that may be inert or may be an alkane, or a mixture thereof and typically hydrogen. For a detailed description of gas phase fluidized bed polymerization processes see U.S. Pat. Nos. 4,543,399; 4,588,790; 5,028,670; 5,352,749 and 5,405,922.

Solution polymerization processes for the polymerization or copolymerization of ethylene are well known in the art (see for example U.S. Pat. Nos. 6,372,864 and 6,777,508). These processes are conducted in the presence of an inert hydrocarbon solvent, typically, a $C_{5-12}$ hydrocarbon which may be unsubstituted or substituted by $C_{1-4}$ alkyl group such as pentane, methyl pentane, hexane, heptane, octane, cyclohexane, methylcyclohexane and hydrogenated naphtha. An example of a suitable solvent which is commercially available is "ISOPAR® E" ($C_{8-12}$ aliphatic solvent, ExxonMobil Chemical). Suitable monomers for copolymerization with ethylene include $C_{3-20}$ mono- and di-olefins. Comonomers include $C_{3-12}$ alpha olefins which are unsubstituted or substituted by up to two $C_{1-6}$ alkyl radicals, $C_{8-12}$ vinyl aromatic monomers which are unsubstituted or substituted by up to two substituents chosen from $C_{1-4}$ alkyl radicals, $C_{4-12}$ straight chained or cyclic diolefins which are unsubstituted or substituted by a $C_{1-4}$ alkyl radical. Illustrative non-limiting examples of such alpha-olefins are one or more of propylene, 1-butene, 1-pentene, 1-hexene, 1-octene and 1-decene, styrene, alpha methyl styrene, and the constrained-ring cyclic olefins such as cyclobutene, cyclopentene, dicyclopentadiene norbornene, alkyl-substituted norbornenes, alkenyl-substituted norbornenes and the like (e.g., 5-methylene-2-norbornene and 5-ethylidene-2-norbornene, bicyclo-(2,2,1)-hepta-2,5-diene).

For an in-series solution phase dual reactor system, is it generally desirable to operate the second reactor, which may be immediately upstream of a devolatilization system, at higher temperature than the first reactor, since the temperature of the polymerization reaction can be used to help flash off the reaction solvent. For a given catalyst system, a temperature difference between the first and second reactors can influence the molecular weight distribution (MWD) of the final polymer, with larger temperature differences favoring increased MWD.

In solution polymerization, the monomers are dissolved or dispersed in the solvent either prior to being fed to the first reactor (or for gaseous monomers the monomer may be fed to the reactor so that it will dissolve in the reaction mixture). Prior to mixing, the solvent and monomers are generally purified to remove potential catalyst poisons such as water, oxygen or metal impurities. The feedstock purification follows standard practices in the art (e.g., molecular sieves, alumina beds and/or oxygen removal catalysts) used for the purification of monomers. The solvent itself as well (e.g., methyl pentane, cyclohexane, hexane or toluene) can be treated in a similar manner.

The feedstock may be heated or cooled prior to feeding to the first reactor. Additional monomers and solvent may be added to the second reactor, and it may be heated or cooled.

While the operating temperatures used in each reactor will vary widely depending on multiple factors such as for example the monomer concentration, the comonomer concentration, the catalyst type and concentration, the solvent used, pressure, equipment design, flow rates, the desired product properties and the like, the first reactor is generally operated at a temperature of between 80° C. and 200° C., while the second reactor is generally operated at a temperature of between 100° C. and 250° C.

In a solution polymerization process, the reaction process can be a "medium pressure process", meaning that the pressure in each reactor can be less than about 6,000 psi (about 42,000 kilopascals or kPa), such as from about 2,000 psi to 3,000 psi (about 14,000 kPa-22,000 kPa).

The residence time distribution of a continuous polymerization reactor will depend on the design and the capacity of the particular reactor. Generally, the reactors should be operated under conditions to achieve a thorough mixing of the reactants. In dual reactor solution polymerization, from 20 weight % to 60 weight % of the final polymer can be polymerized in the first reactor, with the balance being polymerized in the second reactor. On leaving the reactor system the solvent is removed and the resulting polymer is finished in a conventional manner.

In an embodiment of the disclosure, the first polymerization reactor has a smaller volume than the second polymerization reactor.

In an embodiment of the disclosure, the first polymerization reactor is operated at a lower temperature than the second reactor.

The method and apparatus, 100 or 101, of the present disclosure may be used to prepare homopolymers of ethylene and copolymers of ethylene and higher alpha-olefins having densities in the range of, for example, about 0.900-0.970 g/cm$^3$ and especially 0.910-0.930 g/cm$^3$. Such polymers may have a melt index, as measured by the method of ASTM D-1238, condition E, in the range of, for example, about 0.1-200 dg/min. The polymers may be manufactured with narrow or broad molecular weight distribution.

The polymers produced using the method and apparatus, 100 or 101, of the present disclosure are capable of being fabricated into a wide variety of articles, as is known for homopolymers of ethylene and copolymers of ethylene and higher alpha-olefins.

The following examples are presented for the purpose of illustrating selected embodiments of this disclosure; it being understood that the examples presented do not limit the claims presented.

Examples

Figure 3:
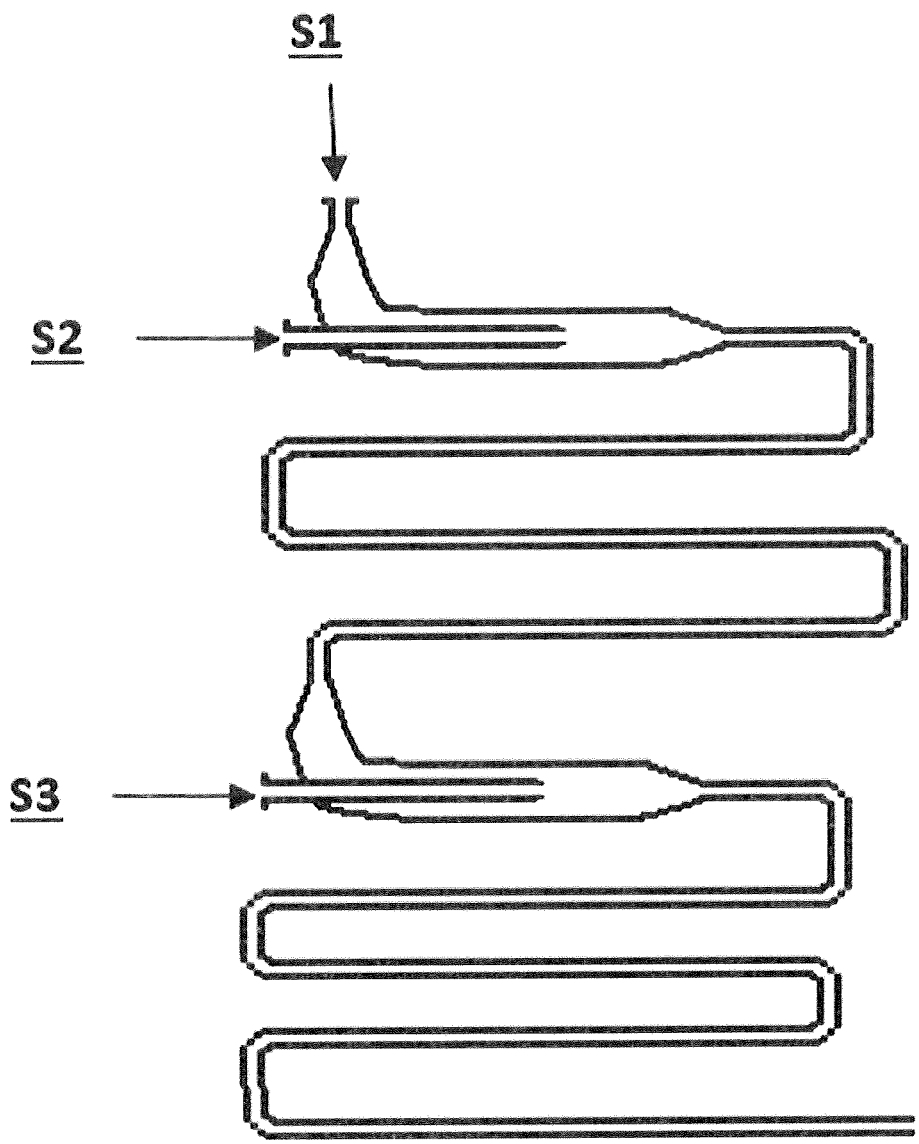
FIG. 3 shows an illustration of a comparative apparatus which can be used for the delivery of a multi-component olefin polymerization catalyst to a polymerization reactor. The Figure shows the presence of three entering streams: S1, S2, and S3.
Figure 4:
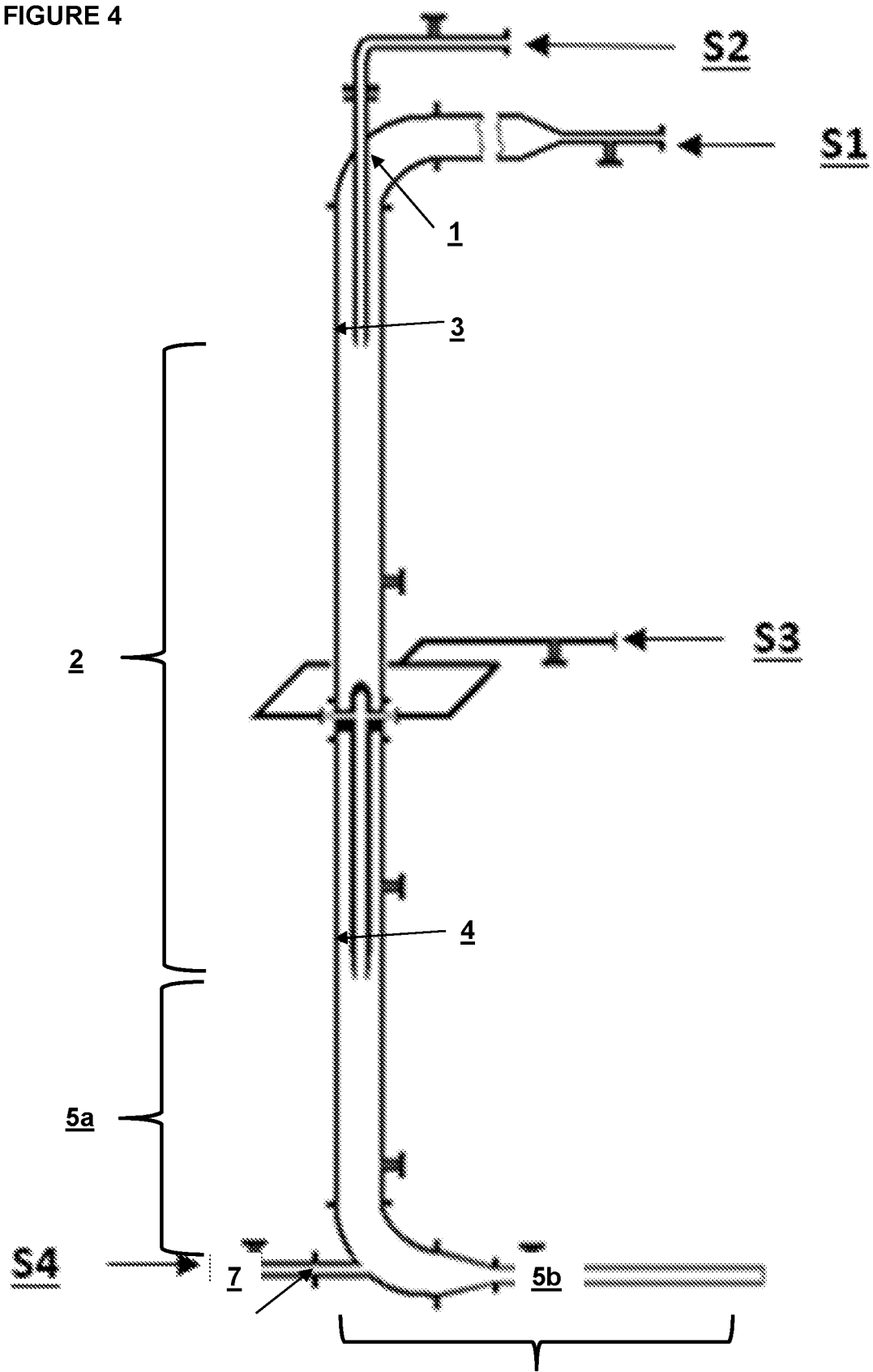
FIG. 4 shows an illustration of an inventive apparatus which can be used for the delivery of a multi-component olefin polymerization catalyst to a polymerization reactor. The Figure shows the presence of four entering streams: S1, S2, S3, and S4.

A Ziegler-Natta pre-polymerization catalyst is made from three catalyst components that are mixed together in line on route to a polymerization reactor, 6 using the apparatus shown in FIG. 3 (Comparative) or FIG. 4 (Inventive).

In examples 1 and 2 and with reference to FIGS. 3 and 4, at least one first catalyst component including tert-butyl chloride (i), dissolved in 2-methylpentane, was pumped as stream S1 through a first catalyst component delivery conduit, 1, to a first catalyst component mixing conduit, 2. At least one second catalyst component including butyl(ethyl) magnesium (ii), together with triethylaluminum (v), $Al_2(CH_2CH_3)_6$, dissolved in 2-methylpentane was pumped as stream S2 through a second catalyst component delivery tube, 3, to the first catalyst component mixing conduit, 2. In the first catalyst component mixing conduit, 2, the catalyst components (i) and (ii) form a magnesium chloride catalyst support during a first hold up time, HUT 1. The catalyst support then flowed from the first catalyst component mixing conduit, 2, to the second catalyst component mixing conduit, 5. An at least one third component including $TiCl_4$ (iii), dissolved in 2-methylpentane, was pumped as stream S3 through a third catalyst component delivery conduit, 4, to the second catalyst component mixing conduit, 5. In the second catalyst component mixing conduit, 5, the magnesium chloride catalyst support and the catalyst component (iii) come together to form a Ziegler-Natta pre-polymerization catalyst during a second hold up time, HUT 2. Diethylaluminum ethoxide (iv), $(C_2H_5)_2AlOC_2H_5$, dissolved in 2-methylpentane, was added directly to the polymerization reactor to give the active Zielger-Natta polymerization catalyst.

By separately feeding catalyst components (i) and (ii) which give rise to a magnesium chloride catalyst support, to a first catalyst component mixing conduit, 2, it can be ensured that the magnesium chloride catalyst support is formed at sufficiently high rates and with reduced formation of catalyst support near the walls of the mixing apparatus where fouling and or plugging could occur. In a coaxial injection arrangement, this may be further facilitated by ensuring that the two catalyst component flows being mixed, S1 and S2, have a Craya-Curtet flow in a specific range. Similarly, by separately feeding the catalyst component (iii), which when combined with the magnesium chloride catalyst support gives rise to a Ziegler-Natta pre-polymerization catalyst, to a second catalyst component mixing conduit, 5, it can be ensured that the pre-polymerization catalyst is formed at sufficiently high rates and with reduced formation of pre-polymerization catalyst near the walls of the mixing, apparatus where fouling and or plugging could occur. In a coaxial injection arrangement, this can be further facilitated by ensuring that the flow of catalyst components from the first catalyst component mixing tube (i.e., the components forming the catalyst support) and being mixed with S3 have a Craya-Curtet flow in a specific range.

Craya-Curtet flows are formed when a jet with moderately large Reynolds number discharges into a coaxial ducted flow of much larger radius. It is seen that the Craya-Curtet number, C, is defined as the square root of the ratio of the momentum flux of the coflowing stream to that of the central jet (see, for example Revuelta et al., Laminar Craya-Curtet Jets, Physics of Fluids, 16, 208 (2004)):

$$C = \left(\frac{J_c}{J_j}\right)^{\frac{1}{2}}$$

In the comparative example 1, and with reference to FIG. 3, no diluent was fed through a conduit to mix with the Ziegler-Natta pre-polymerization catalyst before it was fed into the polymerization reactor. Also the Craya-Curtet number, C, in the first catalyst component mixing conduit, in which the magnesium chloride support is formed, was above 3.

In the inventive example 2, and with reference to FIG. 4, a diluent stream including 2-methylpentane was fed as stream S4 at a high flow rate via a diluent delivery conduit, 7, to mix with the Ziegler-Natty pre-polymerization catalyst during a third hold up time, HUT 3, and before the Zielger-Natta pre-polymerization catalyst was fed into the polymerization reactor. In the inventive example 2, the Craya-Curtet number, C in the first catalyst component mixing conduit, 2 (in which the magnesium chloride support is formed), and in the second catalyst component mixing conduit, 5 (in which the Ziegler-Natta pre-polymerization catalyst was formed), fell well within a range of about 0.65 to about 2.5.

The molar ratios of the in-line Ziegler-Natta catalyst components (i), (ii), (iii), (iv) and (v), the solution and diluent flow rates, the catalyst component mixing times (i.e., hold up times), and the solution temperatures are each provided in Tables 1 and 2.

TABLE 1

Catalyst Component Molar Ratios

| | Example 1 (Comparative) | Example 2 (Inventive) |
|---|---|---|
| t-BuCl (i)/butyl(ethyl)magnesium (ii) | 1.91 | 1.94 |
| $(C_2H_5)_2AlOC_2H_5$ (iv)/$TiCl_4$ (iii) | 1.35 | 1.35 |
| triethylaluminum (v)/$TiCl_4$ (iii) | 0.37 | 0.37 |

TABLE 2

Catalyst Component Flow Rates, HUT's, etc.

| | Example 11 (Comparative) | Example 2 (Inventive) |
|---|---|---|
| S1 Flow rate | 1600 kg/hr | 2319 kg/hr |
| t-BuCl concentration in S1 | 27.7 mmol/l | 28.9 mmol/l |
| S2 Flow Rate | 1600 kg/hr | 1056 kg/hr |
| butyl(ethyl)magnesium concentration in S2 | 14.5 mmol/l | 14.9 mmol/l |
| HUT1 (mixing time in first catalyst component mixing conduit) | 26.8 s | 39.8 s |
| Craya-Curtet number, C in the first catalyst component mixing conduit | 3.22 | 1.0 |
| Temperature 1 (first catalyst component mixing conduit) | 90.0° C. | 70.0° C. |
| S3 Flow Rate | 2600 kg/hr | 1980 kg/hr |
| $TiCl_4$ concentration in S3 | 1.08 mmol/l | 1.21 mmol/l |
| HUT2 (mixing time in upstream section of the second catalyst component mixing conduit) | 9.5 s | 18.6 s |
| Craya-Curtet number, C in the second catalyst component mixing conduit | 1.83 | 1.45 |
| Temperature 2 (upstream section of second catalyst component mixing conduit) | 85.0° C. | 70.0° C. |
| S4 Flow Rate | N/A | 9000 kg/hr |
| HUT3 (mixing time in downstream section of the second catalyst component mixing conduit) | N/A | 3.1 s |

TABLE 2-continued

Catalyst Component Flow Rates, HUT's, etc.

| | Example 11 (Comparative) | Example 2 (Inventive) |
|---|---|---|
| Temperature 3 (downstream section of second catalyst component mixing conduit) | N/A | 30.0° C. |

In Comparative Example 1, the apparatus operated for 13.5 hours, and then became plugged. The apparatus continued to plug on average every 2.6 days. After several attempts, the longest run time recorded before the apparatus became plugged was 10 days.

In Inventive Example 2, the apparatus operated for 6-9 months before the removal of material fouling the apparatus was required.

A person skilled in the art will recognize from the above examples that by avoiding premature precipitation of catalyst support and/or pre-catalytic species, a multi-component polymerization catalyst can be formed in situ en route to an olefin polymerization reactor with reduced risk of fouling of the associated catalyst component feeding systems.

What is claimed is:

1. An apparatus for the delivery of a multi-component olefin polymerization catalyst to a polymerization reactor, the apparatus comprising:
    a first catalyst component delivery conduit;
    a second catalyst component delivery conduit which is disposed within the first catalyst component delivery conduit;
    a first catalyst component mixing conduit;
    a third catalyst component delivery conduit which is disposed within the first catalyst component mixing conduit;
    a second catalyst component mixing conduit comprising an upstream section and a downstream section; and
    a diluent delivery conduit;
    the first and second catalyst component delivery conduits each being open ended and co-terminating at the first catalyst component mixing conduit, the first catalyst component mixing conduit and the third catalyst component delivery conduit each being open ended and co-terminating at the upstream section of the second catalyst component mixing conduit, the diluent delivery conduit being open ended and terminating at the downstream section of the second catalyst component mixing conduit, the downstream section of the second catalyst component mixing conduit being open ended and terminating within the polymerization reactor;
    wherein, at least one first catalyst component soluble in a first solvent is delivered under pressure along with the first solvent to the first catalyst component mixing conduit via the first catalyst component delivery conduit, at least one second catalyst component soluble in a second solvent is delivered under pressure along with the second solvent to the first catalyst component mixing conduit via the second catalyst component delivery conduit, at least one third catalyst component soluble in a third solvent is delivered under pressure along with the third solvent to the upstream section of the second catalyst component mixing conduit via the third catalyst component delivery conduit, and at least one diluent is delivered under pressure to the downstream section of the second catalyst component mixing conduit via the diluent delivery conduit;
    whereby, the at least one first catalyst component soluble in the first solvent comes into contact with the at least one second catalyst component soluble in the second solvent within the first catalyst component mixing conduit to form a catalyst support, the at least one third catalyst component soluble in the third solvent comes into contact with the catalyst support within the upstream section of the second catalyst component mixing conduit to form a pre-polymerization catalyst, and the at least one diluent comes into contact with the pre-polymerization catalyst within the downstream section of the second catalyst component mixing conduit before being expelled into the polymerization reactor.

2. The apparatus of claim 1, wherein the second catalyst component delivery conduit is arranged substantially coaxially within the first catalyst component delivery conduit so that the open ends of the first and second catalyst component delivery conduits co-terminate in a substantially concentric arrangement at the first catalyst component mixing conduit.

3. The apparatus of claim 2, wherein the third catalyst component delivery conduit is arranged substantially coaxially within the first catalyst component mixing conduit so that the open ends of the first catalyst component mixing conduit and the third catalyst component delivery conduit co-terminate in a substantially concentric arrangement at the upstream section of the second catalyst component mixing conduit.

4. The apparatus of claim 3, wherein the downstream section of second catalyst component mixing conduit comprises a conical section in fluid communication with an open-ended tubular section which terminates within the polymerization reactor, the conical section tapering inwardly to meet the open ended tubular section.

5. The apparatus of claim 3, wherein the upstream section and the downstream section of the second catalyst component mixing conduit are disposed substantially perpendicular to one another.

6. The apparatus of claim 1, wherein the first catalyst component delivery conduit, the second catalyst component delivery conduit, the first catalyst component mixing conduit, the third catalyst component delivery conduit and the upstream section of the second catalyst component mixing conduit are coaxially arranged.

7. The apparatus of claim 6, wherein the first catalyst component delivery conduit, the second catalyst component delivery conduit, the first catalyst component mixing conduit, the third catalyst component delivery conduit and the upstream section of the second catalyst component mixing conduit are disposed substantially vertically.

8. The apparatus of claim 1, wherein the first catalyst component delivery conduit, the second catalyst component delivery conduit, and the third catalyst component delivery conduit are in fluid communication with at least one first catalyst component holding tank, at least one second catalyst component holding tank, and at least one third catalyst component holding tank, respectively.

9. The apparatus of claim 1, wherein the diluent delivery conduit is in fluid communication with at least one diluent holding tank.

10. The apparatus of claim 1, wherein the polymerization reactor is a solution phase polymerization reactor.

11. The apparatus of claim 10, wherein the polymerization reactor is a stirred tank reactor.

12. The apparatus of claim 11, wherein the stirred tank reactor comprises a bottom wall, a top wall, and a continuous side wall extending upwardly from the bottom wall to the top wall.

13. The apparatus of claim 12, wherein the downstream section of the second catalyst component mixing conduit extends through the continuous side wall of the stirred tank reactor.

14. The apparatus of claim 12, wherein the downstream section of the second catalyst component mixing conduit extends through the bottom wall of the stirred tank reactor.

15. The apparatus of claim 12, wherein the downstream section of the second catalyst component mixing conduit extends through the top wall of the stirred tank reactor.

16. An apparatus for the delivery of a multi-component olefin polymerization catalyst to a polymerization reactor, the apparatus comprising:
    a first catalyst component delivery conduit;
    a second catalyst component delivery conduit which is disposed within the first catalyst component delivery conduit;
    a first catalyst component mixing conduit;
    a third catalyst component delivery conduit which is annularly disposed around the first catalyst component mixing conduit;
    a second catalyst component mixing conduit comprising an upstream section and a downstream section; and
    a diluent delivery conduit;
    the first and second catalyst component delivery conduits each being open ended and co-terminating at the first catalyst component mixing conduit, the first catalyst component mixing conduit and the third catalyst component delivery conduit each being open ended and co-terminating at the upstream section of the second catalyst component mixing conduit, the diluent delivery conduit being open ended and terminating at the downstream section of the second catalyst component mixing conduit, the downstream section of the second catalyst component mixing conduit being open ended and terminating within the polymerization reactor;
    wherein, at least one first catalyst component soluble in a first solvent is delivered under pressure along with the first solvent to the first catalyst component mixing conduit via the first catalyst component delivery conduit, at least one second catalyst component soluble in a second solvent is delivered under pressure along with the second solvent to the first catalyst component mixing conduit via the second catalyst component delivery conduit, at least one third catalyst component soluble in a third solvent is delivered under pressure along with the third solvent to the upstream section of the second catalyst component mixing conduit via the third catalyst component delivery conduit, and at least one diluent is delivered under pressure to the downstream section of the second catalyst component mixing conduit via the diluent delivery conduit;
    whereby, the at least one first catalyst component soluble in the first solvent comes into contact with the at least one second catalyst component soluble in the second solvent within the first catalyst component mixing conduit to form a catalyst support, the at least one third catalyst component soluble in the third solvent comes into contact with the catalyst support within the upstream section of the second catalyst component mixing conduit to form a pre-polymerization catalyst, and the at least one diluent comes into contact with the pre-polymerization catalyst within the downstream section of the second catalyst component mixing conduit before being expelled into the polymerization reactor.

17. A method for the delivery of a multi-component olefin polymerization catalyst to a polymerization reactor, the method comprising:
    feeding at least one first catalyst component soluble in a first solvent to a first catalyst component mixing conduit via a first catalyst component delivery conduit,
    feeding at least one second catalyst component soluble in a second solvent to the first catalyst component mixing conduit via a second catalyst component delivery conduit which is disposed within the first catalyst component delivery conduit,
    feeding at least one third catalyst component soluble in a third solvent to an upstream section of a second catalyst component mixing conduit comprising an upstream section and a downstream section via a third catalyst component delivery conduit which is disposed within the first catalyst component mixing conduit, and
    feeding at least one diluent to the downstream section of the second catalyst mixing conduit via a diluent delivery conduit;
    wherein, the at least one first catalyst component soluble in the first solvent and the at least one second catalyst component soluble in the second solvent come into contact with one another within the first catalyst component mixing conduit to form a catalyst support, the at least one third catalyst component soluble in the third solvent and the catalyst support come into contact with one another within the upstream section of the second catalyst component mixing conduit to form a pre-polymerization catalyst, and the at least one diluent comes in contact with the pre-polymerization catalyst within the downstream section of the second catalyst component mixing conduit before being expelled into the polymerization reactor.

18. The method of claim 17, wherein the hold-up time in the first catalyst component mixing conduit is from 10 to 90 seconds.

19. The method of claim 17, wherein the hold-up time in the first catalyst component mixing conduit is from 20 to 50 seconds.

20. The method of claim 17, wherein the hold-up time in the upstream section of the second catalyst component mixing conduit is from 1 to 50 seconds.

21. The method of claim 17, wherein the hold-up time in the downstream section of the second catalyst component mixing conduit is from 1 to 10 seconds.

22. The method of claim 17, wherein the at least one first catalyst component soluble in the first solvent comprises a halide compound.

23. The method of claim 22, wherein the halide compound is a chloride compound.

24. The method of claim 23, wherein the chloride compound is tert-butyl chloride.

25. The method of claim 17, wherein the at least one second catalyst component soluble in the second solvent comprises an organomagnesium compound.

26. The method of claim 25, wherein the organomagnesium compound is butyl(ethyl)magnesium.

27. The method of claim 17, wherein the at least one third catalyst component soluble in the third solvent comprises a transition metal compound.

28. The method of claim 27, wherein the transition metal compound is titanium tetrachloride.

29. The method of claim 17, wherein the at least one diluent comprises a hydrocarbon diluent.

30. The method of claim 29, wherein the hydrocarbon diluent is 2-methylpentane.

31. The method of claim 17, further comprising feeding at least one fourth catalyst component soluble in a fourth solvent to the downstream section of the second catalyst mixing conduit via the diluent delivery conduit.

32. The method of claim 31, wherein the at least one fourth catalyst component comprises an organoaluminum co-catalyst.

33. The method of claim 32, wherein the fourth solvent is a hydrocarbon.

34. The method of claim 33, wherein the organoaluminum co-catalyst is diethyl aluminum ethoxide.

35. The method of claim 34, wherein the hydrocarbon is 2-methylpentane.

36. The method of claim 17, further comprising feeding at least one fourth catalyst component soluble in a fourth solvent to either the upstream section or the downstream section of the second catalyst mixing conduit via a fourth catalyst component delivery conduit.

37. The method of claim 36, wherein the at least one fourth catalyst component comprises an organoaluminum co-catalyst.

38. The method of claim 37, wherein the fourth solvent is a hydrocarbon.

39. The method of claim 38, wherein the organoaluminum co-catalyst is diethyl aluminum ethoxide.

40. The method of claim 39, wherein the hydrocarbon is 2-methylpentane.

41. The method of claim 17, wherein the polymerization reactor is a solution phase polymerization reactor.

42. The method of claim 17, wherein the polymerization reactor is a stirred tank reactor.

43. A method for the delivery of a multi-component olefin polymerization catalyst to a polymerization reactor, the method comprising:

feeding at least one first catalyst component soluble in a first solvent to a first catalyst component mixing conduit via a first catalyst component delivery conduit, feeding at least one second catalyst component soluble in a second solvent to the first catalyst component mixing conduit via a second catalyst component delivery conduit which is disposed within the first catalyst component delivery conduit, feeding at least one third catalyst component soluble in a third solvent to an upstream section of a second catalyst component mixing conduit comprising an upstream section and a downstream section via a third catalyst component delivery conduit which is annularly disposed around the first catalyst component mixing conduit, and feeding at least one diluent to the downstream section of the second catalyst mixing conduit via a diluent delivery conduit;

wherein, the at least one first catalyst component soluble in the first solvent and the at least one second catalyst component soluble in the second solvent come into contact with one another within the first catalyst component mixing conduit to form a catalyst support, the at least one third catalyst component soluble in the third solvent and the catalyst support come into contact with one another within the upstream section of the second catalyst component mixing conduit to form a pre-polymerization catalyst, and the at least one diluent comes in contact with the pre-polymerization catalyst within the downstream section of the second catalyst component mixing conduit before being expelled into the polymerization reactor.

\* \* \* \* \*